(12) United States Patent
Ono

(10) Patent No.: US 10,351,702 B2
(45) Date of Patent: Jul. 16, 2019

(54) RESIN COMPOSITION FOR ELECTRIC/ELECTRONIC COMPONENT

(71) Applicant: MOMENTIVE PERFORMANCE MATERIALS JAPAN LLC, Minato-ku, Tokyo (JP)

(72) Inventor: Kazuhisa Ono, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 51 days.

(21) Appl. No.: 15/564,648

(22) PCT Filed: Apr. 4, 2016

(86) PCT No.: PCT/JP2016/061007
§ 371 (c)(1),
(2) Date: Oct. 5, 2017

(87) PCT Pub. No.: WO2016/163333
PCT Pub. Date: Oct. 13, 2016

(65) Prior Publication Data
US 2018/0079904 A1 Mar. 22, 2018

(30) Foreign Application Priority Data
Apr. 8, 2015 (JP) .................................. 2015-079509

(51) Int. Cl.
| | |
|---|---|
| *C08L 83/04* | (2006.01) |
| *C09D 171/02* | (2006.01) |
| *C09D 183/08* | (2006.01) |
| *C08K 9/04* | (2006.01) |
| *C09K 3/10* | (2006.01) |
| *C08L 71/02* | (2006.01) |
| *C08L 83/08* | (2006.01) |
| *C09D 7/40* | (2018.01) |
| *C09D 7/62* | (2018.01) |
| *C08G 77/06* | (2006.01) |
| *C08G 77/20* | (2006.01) |
| *C08G 77/28* | (2006.01) |
| *C09D 183/04* | (2006.01) |
| *C08G 77/00* | (2006.01) |

(52) U.S. Cl.
CPC .............. *C08L 83/04* (2013.01); *C08G 77/06* (2013.01); *C08G 77/20* (2013.01); *C08G 77/28* (2013.01); *C08K 9/04* (2013.01); *C08L 71/02* (2013.01); *C08L 83/08* (2013.01); *C09D 7/40* (2018.01); *C09D 7/62* (2018.01); *C09D 171/02* (2013.01); *C09D 183/04* (2013.01); *C09D 183/08* (2013.01); *C09K 3/10* (2013.01); *C08G 77/70* (2013.01); *C08L 2203/206* (2013.01); *C08L 2205/025* (2013.01); *C08L 2205/03* (2013.01); *C08L 2205/035* (2013.01)

(58) Field of Classification Search
CPC ................................ C08G 77/20; C08G 77/28
See application file for complete search history.

(56) References Cited

U.S. PATENT DOCUMENTS

| | | | |
|---|---|---|---|
| 4,066,603 A | 1/1978 | Homan et al. | |
| 4,780,486 A * | 10/1988 | Lee ....................... | C03C 25/106 522/14 |
| 5,063,102 A | 11/1991 | Lee et al. | |
| 8,716,362 B2 | 5/2014 | Ono et al. | |
| 2002/0113334 A1 | 8/2002 | Matsuoka et al. | |
| 2013/0065983 A1 | 3/2013 | Ono et al. | |
| 2015/0140346 A1 | 5/2015 | Iida et al. | |
| 2015/0232666 A1 | 8/2015 | Ono et al. | |

FOREIGN PATENT DOCUMENTS

| | | |
|---|---|---|
| EP | 0430273 A2 | 6/1991 |
| GB | 1577894 A | 10/1980 |
| JP | 52105998 A | 9/1977 |
| JP | 52110762 A | 9/1977 |
| JP | 58129053 A | 8/1983 |
| JP | 60110752 A | 6/1985 |
| JP | 04239563 A | 8/1992 |
| JP | 10100166 A | 4/1998 |

(Continued)

OTHER PUBLICATIONS

Extended European Search Report (EESR) dated Oct. 29, 2018 issued in European Application No. 16776499.2.

(Continued)

*Primary Examiner* — Kuo Liang Peng
(74) *Attorney, Agent, or Firm* — Holtz, Holtz & Volek PC

(57) ABSTRACT

A resin composition which includes: (A) a polyorganosiloxane that contains a mercaptoalkyl group bonded to a silicon atom and has a viscosity at 23° C. of 20 to 3,000 cP; (B) a polyorganosiloxane containing an aliphatic unsaturated group; (C) a photoreaction initiator; (D) a chemically surface-treated silica having a BET specific surface area of 50 to 250 m$^2$/g and a pH of 5.0 to 9.0; and (E) a polyoxyalkylene glycol, and/or a derivative of the polyoxyalkylene glycol. (B) includes: a linear polyorganosiloxane; and optionally a branched polyorganosiloxane. The ratio of mercaptoalkyl groups in (A) to the total aliphatic unsaturated groups in (B) is 0.45 to 2.00, the content of (D) is 0.5 to 26 parts relative to 100 parts by mass of (B), the content of (E) is 0.001 to 1.0 mass % relative to the total mass of (A) to (E), and the viscosity at 23° C. is 500 to 100,000 cP.

20 Claims, No Drawings

(56) References Cited

FOREIGN PATENT DOCUMENTS

| | | |
|---|---|---|
| JP | 2005171189 A | 6/2005 |
| JP | 2008024944 A | 2/2008 |
| JP | 5497241 B1 | 5/2014 |
| JP | 5524424 B1 | 6/2014 |
| WO | 2014181609 A1 | 11/2014 |

OTHER PUBLICATIONS

International Search Report (ISR) and Written Opinion dated Jun. 14, 2016 issued in International Application No. PCT/JP2016/061007.

* cited by examiner

RESIN COMPOSITION FOR ELECTRIC/ELECTRONIC COMPONENT

TECHNICAL FIELD

The present invention relates to a resin composition for electric/electronic components, and an electric/electronic component using the composition.

BACKGROUND ART

Various resin compositions are used conventionally to protect the surface of electric/electronic components and to prevent the attachment or the like of soil and water. Silicone resin compositions with their excellent characteristics such as heat resistance and weather resistance are used for such applications (see Patent Literatures 1 to 3). Such silicone resin compositions are used, i.e., applied and cured as agents such as coating agents, potting agents and liquid gasket agents, to protect the surface of electric/electronic components.

CITATION LIST

Patent Literature

Patent Literature 1: Japanese Patent Application Kokai Publication No. 2008-024944
Patent Literature 2: Japanese Patent No. 5497241
Patent Literature 3: Japanese Patent Application Kokai Publication No. H4-239563

SUMMARY OF INVENTION

Technical Problem

In electric/electronic components such as semiconductor devices, printed circuit boards and battery materials, needs often arise that areas that require protection are coated selectively while other areas receive no such treatment to avoid adverse effects caused by the treatment. When, in particular, the silicone resin compositions described in Patent Literatures 1 to 3 are used, their releasability inhibits bonding characteristics from being established in a subsequent step where bonding is performed. To prevent such problems, it is necessary that the composition scarcely flows out of portions at which bonds will be formed. If the resin composition flows out of regions that require protection, wiping operation adds loads and steps.

When a resin composition is applied to predetermined areas in a selective manner by being ejected through an ejection nozzle of a dispensing machine or the like, the composition sometimes forms a string that extends from the tip of the ejection nozzle. If the coating operation is performed while moving the nozzle, a severe string causes the liquid to drip onto portions that do not require coating, or causes the nozzle travel speed to be decreased to avoid dripping of the liquid, thus giving rise to a lowering of work efficiency.

A problem to be solved by the invention is therefore to provide a resin composition for electric/electronic components which is less stringy and has good ejectability to realize excellent workability, and which retains a shape after being applied and scarcely flows out of the applied areas.

Solution to Problem

A summary of the invention is described below.

(1) A resin composition for an electric/electronic component, comprising (A) a polyorganosiloxane that contains a mercaptoalkyl group bonded to a silicon atom and has a viscosity at 23° C. of 20 to 3,000 cP; (B) a polyorganosiloxane containing an aliphatic unsaturated group wherein the polyorganosiloxane (B) includes (B1) a linear polyorganosiloxane represented by the formula (I):

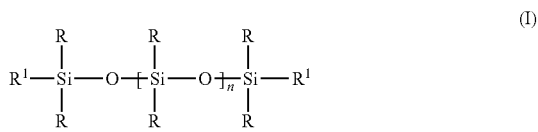

wherein each $R^1$ is independently an aliphatic unsaturated group, each R is independently a C1-C6 alkyl group or a C6-C12 aryl group, and n is a value such that the viscosity at 23° C. is 100 to 12,000 cP, and optionally (B2) a branched polyorganosiloxane including a $SiO_{4/2}$ unit, an $R'_3SiO_{1/2}$ unit and an $R'_2SiO_{2/2}$ unit, and optionally further an $R'SiO_{3/2}$ unit wherein each R' independently represents a C1-C6 alkyl group or an aliphatic unsaturated group, and at least three R' groups per molecule of the branched polyorganosiloxane (B2) are aliphatic unsaturated groups; (C) a photoreaction initiator; (D) a chemically surface-treated silica having a BET specific surface area of 50 to 250 $m^2/g$ and a pH of 5.0 to 9.0; and (E) a polyoxyalkylene glycol in which an alkylene unit is a linear or branched alkylene group having 2 to 4 carbon atoms, and/or a derivative of the polyoxyalkylene glycol, wherein the ratio of the number of mercaptoalkyl groups in (A) to the total number of aliphatic unsaturated groups in (B) is 0.45 to 2.00, the content of (D) is 0.5 to 26 parts by mass relative to 100 parts by mass of (B), the proportion of the content of (E) is 0.001 to 1.0 mass % relative to the total mass of (A) to (E), and the viscosity at 23° C. is 500 to 100,000 cP.

(2) The resin composition described in (1), wherein (D) is a chemically surface-treated fumed silica.

(3) The resin composition described in (1) or (2), wherein (D) has been chemically treated with a silazane compound or with an alkoxysilane compound having a linear or branched alkyl group with 6 to 18 carbon atoms.

(4) The resin composition described in any one of (1) to (3), wherein (D) has been chemically treated with hexamethyldisilazane or octyltrimethoxysilane.

(5) The resin composition described in any one of (1) to (4), wherein the carbon content in (D) is 2.0 to 10.0 mass %.

(6) The resin composition described in any one of (1) to (5), wherein the number average molecular weight of (E) is 500 to 10,000.

(7) The resin composition described in any one of (1) to (6), wherein (E) is polyoxyethylene glycol or polyoxypropylene glycol.

(8) The resin composition described in any one of (1) to (7), wherein (E) is polyoxypropylene glycol.

(9) The resin composition described in any one of (1) to (8), wherein the content of (C) is 0.05 to 50 parts by mass relative to 100 parts by mass of (B).

(10) The resin composition described in any one of (1) to (9), further comprising (F) an aliphatic unsaturated group-containing silane coupling agent.

(11) The resin composition described in any one of (1) to (10), which is a coating agent, a potting agent or a liquid gasket agent.

(12) An electric/electronic component protected using the resin composition described in any one of (1) to (10).

Advantageous Effects of Invention

The resin compositions for electric/electronic components provided according to the present invention are less stringy and have good ejectability to realize excellent workability, and retain the shapes after being applied and scarcely flow out of the applied areas.

DESCRIPTION OF EMBODIMENTS

A resin composition for an electric/electronic component (hereinafter, also written as a resin composition) comprises (A) a polyorganosiloxane that contains a mercaptoalkyl group bonded to a silicon atom and has a viscosity at 23° C. of 20 to 3,000 cP; (B) a polyorganosiloxane containing an aliphatic unsaturated group wherein the polyorganosiloxane (B) includes (B1) a linear polyorganosiloxane represented by the formula (I):

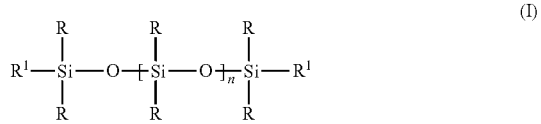

wherein each $R^1$ is independently an aliphatic unsaturated group, each R is independently a C1-C6 alkyl group or a C6-C12 aryl group, and n is a value such that the viscosity at 23° C. is 100 to 12,000 cP, and optionally (B2) a branched polyorganosiloxane including a $SiO_{4/2}$ unit, an $R'_3SiO_{1/2}$ unit and an $R'_2SiO_{2/2}$ unit, and optionally further an $R'SiO_{3/2}$ unit wherein each R' independently represents a C1-C6 alkyl group or an aliphatic unsaturated group, and at least three R' groups per molecule of the branched polyorganosiloxane (B2) are aliphatic unsaturated groups; (C) a photoreaction initiator; (D) a chemically surface-treated silica having a BET specific surface area of 50 to 250 $m^2/g$ and a pH of 5.0 to 9.0; and (E) a polyoxyalkylene glycol in which an alkylene unit is a linear or branched alkylene group having 2 to 4 carbon atoms, and/or a derivative of the polyoxyalkylene glycol, wherein the ratio of the number of mercaptoalkyl groups in (A) to the total number of aliphatic unsaturated groups in (B) is 0.45 to 2.00, the content of (D) is 0.5 to 26 parts by mass relative to 100 parts by mass of (B), the proportion of the content of (E) is 0.001 to 1.0 mass % relative to the total mass of (A) to (E), and the viscosity at 23° C. is 500 to 100,000 cP.

The resin composition includes (A) a polyorganosiloxane that contains a mercaptoalkyl group bonded to a silicon atom and has a viscosity at 23° C. of 20 to 3,000 cP.

To ensure a stable structure formed by crosslinking reaction and to avoid excessive curing shrinkage, the average number of mercaptoalkyl groups bonded to silicon atoms per molecule of (A) may be not less than 2 and not more than 20, preferably more than 2 and not more than 10, and more preferably 3 to 7.

In (A), the alkyl moiety of the mercaptoalkyl group bonded to a silicon atom may be a C1-C6 alkyl group. Examples of the mercaptoalkyl groups include mercaptomethyl, 2-mercaptoethyl, 3-mercaptopropyl, 4-mercaptobutyl and 6-mercaptohexyl. From the points of view such as ease of synthesis, mercaptomethyl and 3-mercaptopropyl are preferable, and 3-mercaptopropyl is more preferable.

In (A), organic groups other than the mercaptoalkyl groups bonded to silicon atoms may be unsubstituted or substituted, monovalent hydrocarbon groups (with the proviso that aliphatic unsaturated groups are excluded). Specific examples include alkyl groups, for example, C1-C6 alkyl groups (e.g., methyl, ethyl, propyl, etc.); cycloalkyl groups, for example, C3-C10 cycloalkyl groups (e.g., cyclohexyl, etc.); aryl groups, for example, C6-C12 aryl groups (e.g., phenyl, tolyl, xylyl, etc.); aralkyl groups, for example, C7-C13 aralkyl groups (e.g., 2-phenylethyl, 2-phenylpropyl, etc.); and substituted hydrocarbon groups, for example, halogen-substituted hydrocarbon groups (e.g., chloromethyl, chlorophenyl, 3,3,3-trifluoropropyl, etc.). From the points of view such as ease of synthesis, alkyl groups are preferable, in particular, methyl, ethyl and propyl are preferable, and methyl is more preferable. Aryl groups may be used together therewith in order to control a refractive index, and, in particular, phenyl is preferable from the points of view such as ease of synthesis.

The structure of the main chain of (A) may be any of linear, branched and cyclic, but is preferably branched. An example is a mercaptoalkyl group-containing, branched polyorganosiloxane which includes an $R''SiO_{3/2}$ unit, an $R''_3SiO_{1/2}$ unit and an $R''_2SiO_{2/2}$ unit, and optionally further a $SiO_{4/2}$ unit (wherein each R'' independently represents an unsubstituted or substituted, monovalent hydrocarbon group (with the proviso that aliphatic unsaturated groups are excluded)), and in which 2 to 20 R'' groups per molecule are mercaptoalkyl groups. In the present specification, the $R''SiO_{3/2}$ units, the $R''_3SiO_{1/2}$ units, the $R''_2SiO_{2/2}$ units and the $SiO_{4/2}$ units are also written as siloxane units. Examples of the mercaptoalkyl groups and the unsubstituted or substituted, monovalent hydrocarbon groups include those groups mentioned hereinabove. The mercaptoalkyl groups R'' may be R'' groups in any units, but are preferably R'' groups in the $R''SiO_{3/2}$ units. From the points of view of workability and crosslinking reactivity, the ratio of the number of mercaptoalkyl-containing siloxane units to the number of mercaptoalkyl-free siloxane units is preferably 1:60 to 1:5, although not particularly limited thereto.

The viscosity of (A) at 23° C. is 20 to 3,000 cP. The viscosity in this range offers good workability and compatibility, and ensures that the resin composition exhibits good storage properties. The viscosity is preferably 20 to 1,500 cP, more preferably 30 to 1,000 cP, and particularly preferably 50 to 500 cP.

In the present specification, the viscosity of (A) and that of (B1) described later are values measured with a rotational viscometer (VISMETRON VDA-L) (manufactured by SHIBAURA SYSTEMS CO., LTD.). The measurement was made with No. 2 rotor at 60 rpm in the range of 400 cP and below, with No. 3 rotor at 60 rpm in the range of more than 400 to 1,500 cP, with No. 4 rotor at 60 rpm in the range of more than 1,500 cP to 10,000 cP, with No. 4 rotor at 30 rpm in the range of more than 10,000 to 20,000 cP, and with No. 4 rotor at 12 rpm in the range of more than 20,000 cP. The measured values are values at 23° C.

The number of mercapto groups in (A) may be determined by colorimetric titration with iodine. This method utilizes the reaction in which the liquid being titrated turns into light yellow in the presence of a slight excess of iodine during titration.

The reaction is shown by the formula:

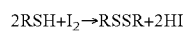

The component (A) may be prepared by any method without limitation. For example, it may be produced by the hydrolysis, polycondensation and re-equilibration of a mercaptoalkylalkoxysilane such as 3-mercaptopropyltrimethoxysilane, 3-mercaptopropyltriethoxysilane, 3-mercaptopropylmethyldimethoxysilane, 3-mercaptopropylmethyldiethoxysilane, 3-mercaptopropyldimethylmethoxysilane or 3-mercaptopropyldimethylethoxysilane, with a desired alkylchlorosilane, alkylalkoxysilane or silanol-containing siloxane.

The component (A) may be used singly, or two or more may be used in combination.

The resin composition comprises (B) a polyorganosiloxane containing an aliphatic unsaturated group. The polyorganosiloxane (B) includes (B1) a linear polyorganosiloxane represented by the formula (I):

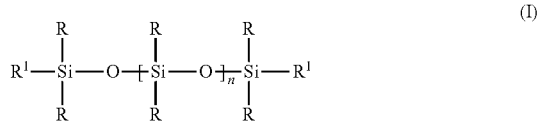

(I)

wherein each $R^1$ is independently an aliphatic unsaturated group, each R is independently a C1-C6 alkyl group or a C6-C12 aryl group, and n is a value such that the viscosity at 23° C. is 100 to 12,000 cP, and optionally (B2) a branched polyorganosiloxane including a $SiO_{4/2}$ unit, an $R'_3SiO_{1/2}$ unit and an $R'_2SiO_{2/2}$ unit, and optionally further an $R'SiO_3$ unit wherein each R' independently represents a C1-C6 alkyl group or an aliphatic unsaturated group, and at least three R' groups per molecule of the branched polyorganosiloxane (B2) are aliphatic unsaturated groups.

In (B), the component (B2) is optional and may be added for purposes such as to control the hardness of cured products. In particular, the use of (B2) makes it possible to enhance the bonding to adherends. For example, the component (B2) is preferably used in such an amount that the proportion of the number of aliphatic unsaturated groups in (B2) is 0 to 95%, relative to the total number of aliphatic unsaturated groups in (B). From the point of view of quick curability, the proportion of the number of aliphatic unsaturated groups in (B2) is more preferably 30 to 85%, and particularly preferably 40 to 70%.

In the formula (I) which relates to (B1), each $R^1$ is an aliphatic unsaturated group. The groups $R^1$ at both ends may be the same as or different from each other, and are preferably the same as each other.

Examples of the aliphatic unsaturated groups include alkenyl groups, for example, C2-C6 alkenyl groups (e.g., vinyl, propenyl, butenyl, hexenyl, etc.). Alkenyl groups having an unsaturated end are more preferable. From the points of view such as ease of synthesis, a vinyl group is preferable.

In the formula (I), each R is a C1-C6 alkyl group (for example, methyl, ethyl, propyl, etc.) or a C6-C12 aryl group (for example, phenyl, tolyl, xylyl, etc.). The groups R may be the same as or different from each other.

From the points of view of the viscosity, thixotropy and storage stability of the resin composition, and also to attain a refractive index which is close to that of the component (A) and to enhance the compatibility with the component (A), it is preferable that 0 to 20 mol % of the groups R are C6-C12 aryl groups, and this proportion is more preferably 2 to 15 mol %, and particularly preferably 3 to 10 mol %.

From the points of view such as ease of synthesis, the C1-C6 alkyl groups are preferably methyl, and the C6-C12 aryl groups are preferably phenyl.

From the point of view of the workability of the resin composition, the viscosity of (B1) at 23° C. is 100 to 12,000 cP. The viscosity in this range ensures that when the composition is ejected through an ejection nozzle or the like, the material remaining at the tip of the orifice is resistant to form a string (exhibits low stringiness) and the tip may be moved without causing a contamination of parts and materials. The productivity of products using the resin composition is significantly affected by the ejectability of the resin composition and the ability to retain the shape after being applied. From the points of view of these properties, the viscosity of (B1) at 23° C. is preferably 500 to 10,000 cP, and particularly preferably 1,000 to 5,000 cP.

The component (B1) may be prepared by any method without limitation. For example, it may be obtained by a method where chlorosilanes that are needed to form a desired structure, such as dimethyldichlorosilane, diphenyldichlorosilane, methylphenyldichlorosilane or dimethylvinylchlorosilane are polycondensed and re-equilibrated, a method where alkoxysilanes that are needed to form a desired structure, such as dimethyldimethoxysilane, diphenyldimethoxysilane, methylphenyldimethoxysilane and dimethylvinylmethoxysilane are co-hydrolyzed, polycondensed and re-equilibrated, or a combination of these methods. Alternatively, the component may be obtained by the ring-opening polymerization and re-equilibration of siloxanes that are needed to form a desired structure, such as 1,1,3,3,5,5,7,7-octamethylcyclotetrasiloxane, 1,1,3,3,5,5,7,7-octaphenylcyclotetrasiloxane or 1,1,3,3-tetramethyl-1,3-divinyldisiloxane, in the presence of an alkali catalyst (such as alkali metal hydroxide salts, alkali metal silanolates or an ammonium hydroxide salt) or an acid catalyst (such as sulfuric acid, sulfuric acid silanolates or trifluoromethanesulfonic acid).

The component (B1) may be used singly, or two or more may be used in combination. When two or more components (B1) are used in combination, the combination may include (B1) having a viscosity of 100 to 2,000 cP and (B1) having a viscosity of more than 2,000 cP and not more than 5,000 cP.

The component (B2) is a branched polyorganosiloxane which includes a $SiO_{4/2}$ unit, an $R'_3SiO_{1/2}$ unit and an $R'_2SiO_{2/2}$ unit, and optionally further an $R'SiO_{3/2}$ unit wherein each R' independently represents a C1-C6 alkyl group or an aliphatic unsaturated group, and at least three R' groups per molecule of the branched polyorganosiloxane (B2) are aliphatic unsaturated groups.

An example of (B2) is a branched polyorganosiloxane which has 6 to 10 mol of $SiO_{4/2}$ units and 4 to 8 mol of $R'_3SiO_{1/2}$ units per 1 mol of $R'_2SiO_{2/2}$ units. The component (B2) is preferably a resinous or liquid compound that is solid to viscous semisolid at room temperature. For example, the weight average molecular weight thereof is 1,000 to 400,000, and preferably 2,000 to 200,000. The weight average molecular weight is a value determined by gel permeation chromatography (GPC) using a polystyrene calibration curve.

Examples of the aliphatic unsaturated groups represented by R' include those aliphatic unsaturated groups mentioned for (B1). Specific examples include alkenyl groups, for example, C2-C6 alkenyl groups (e.g., vinyl, propenyl, butenyl, hexenyl, etc.). Alkenyl groups having an unsaturated end are more preferable. From the points of view such as ease of synthesis, a vinyl group is preferable. The aliphatic unsaturated groups R' may be R' groups in any units, but are preferably R' groups in the $R'_2SiO_{2/2}$ units.

The groups R' other than the aliphatic unsaturated groups are preferably C1-C6 alkyl groups (e.g., methyl, ethyl, propyl, etc.), and, in light of heat resistance, are more preferably methyl groups.

When the component (B2) is used, it may be used singly, or two or more may be used in combination.

The numbers of aliphatic unsaturated groups in (B1) and (B2) may be obtained by determining the average structural formulas by NMR, calculating the molecular weights, and analyzing the molecular weights.

The resin composition comprises (C) a photoreaction initiator. The component (C) is a component that functions as a radical initiator in the photocrosslinking of (A) and (B), or as a sensitizer. From the point of view of reactivity, examples of (C) include aromatic hydrocarbons, acetophenone and its derivatives, benzophenone and its derivatives, o-benzoylbenzoic acid esters, benzoin and benzoin ethers and their derivatives, xanthone and its derivatives, disulfide compounds, quinone compounds, halogenated hydrocarbons and amines, and organic peroxides. From the points of view of the compatibility with the silicones (A) and (B) present in the resin composition, and stability, compounds having an unsubstituted or substituted benzoyl group, or organic peroxides are more preferable.

Examples of (C) include acetophenone, propiophenone, 2-hydroxy-2-methylpropiophenone, 2,2-dimethoxy-1,2-diphenylethan-1-one (IRGACURE 651: manufactured by BASF SE), 2-hydroxy-2-methyl-1-phenyl-propan-1-one (DAROCUR 1173: manufactured by BASF SE), 1-hydroxy-cyclohexyl-phenyl-ketone (IRGACURE 184: manufactured by BASF SE), 1-[4-(2-hydroxyethoxy)-phenyl]-2-hydroxy-2-methyl-1-propan-1-one (IRGACURE 2959: manufactured by BASF SE), 2-hydroxy-1-{4-[4-(2-hydroxy-2-methyl-propionyl)-benzyl]phenyl}-2-methyl-propan-1-one (IRGACURE 127: manufactured by BASF SE), 2-methyl-1-(4-methylthiophenyl)-2-morpholinopropan-1-one
(IRGACURE 907: manufactured by BASF SE), 2-benzyl-2-dimethylamino-1-(4-morpholinophenyl)-butanone-1 (IRGACURE 369: manufactured by BASF SE), 2-(dimethyl-amino)-2-[(4-methylphenyl)methyl]-1-[4-(4-morpholinyl) phenyl]-1-butanone (IRGACURE 379: manufactured by BASF SE); 2,4,6-trimethylbenzoyl-diphenyl-phosphine oxide (LUCIRIN TPO: manufactured by BASF SE), bis(2, 4,6-trimethylbenzoyl)-phenylphosphine oxide (IRGACURE 819: manufactured by BASF SE); 1,2-octanedione, 1-[4-(phenylthio)-,2-(O-benzoyloxime)](IRGACURE OXE 01: manufactured by BASF SE); ethanone, 1-[9-ethyl-6-(2-methylbenzoyl)-9H-carbazol-3-yl]-,1-(O-acetyloxime) (IRGACURE OXE 02: manufactured by BASF SE); a mixture of oxyphenylacetic acid, 2-[2-oxo-2-phenylacetoxyethoxy] ethyl ester and oxyphenylacetic acid, 2-(2-hydroxyethoxy) ethyl ester (IRGACURE 754: manufactured by BASF SE), phenylglyoxylic acid methyl ester (DAROCUR MBF: manufactured by BASF SE), ethyl-4-dimethylaminobenzo-ate (DAROCUR EDB: manufactured by BASF SE), 2-eth-ylhexyl-4-dimethylaminobenzoate (DAROCUR EHA: manufactured by BASF SE), bis(2,6-dimethoxybenzoyl)-2, 4,4-trimethyl-pentylphosphine oxide (CGI 403: manufactured by BASF SE), benzoyl peroxide and cumene peroxide.

The component (C) may be used singly, or two or more may be used in combination. Examples of two or more components (C) used in combination include a combination of 2-hydroxy-2-methylpropiophenone with 2,2-dimethoxy-1,2-diphenylethan-1-one, and a combination of 1-hydroxy-cyclohexyl phenyl ketone with bis(2,4,6-trimethylbenzoyl)-phenylphosphine oxide.

The resin composition comprises (D) a chemically surface-treated silica having a BET specific surface area of 50 to 250 $m^2/g$ and a pH of 5.0 to 9.0. As a result of the surface having been chemically treated, the compatibility and/or thixotropy of the resin composition can be enhanced. In the present specification, the phrase "chemically treated" means that the surface has been treated with a compound having reactivity with silanol groups on the silica surface to form covalent bonds of different types of groups from the silanol groups.

The pH of the silica means a pH at 23° C. of a 40 g/L silica dispersion prepared using a 50 vol % methanol/ion exchange water solution.

Silicas may be largely classified by production methods into wet method silicas such as precipitated silica, gel method silica and sol method silica, and dry method silicas such as fumed silica (gas phase silica). Of these, fumed silica is preferable from the points of view of thixotropy-imparting ability, influence on ejection performance, and stability of the composition.

Fumed silica is also called dry method silica as distinguished from wet method silicas. It is generally produced by a flame hydrolysis method. Specifically, it is generally known to be produced by burning silicon tetrachloride together with hydrogen and oxygen. Silanes such as methyltrichlorosilane or trichlorosilane may be used singly in place of silicon tetrachloride, or may be used in the form of a mixture with silicon tetrachloride. Fumed silicas are available under the tradenames of Aerosil from NIPPON AEROSIL CO., LTD. and QS type from Tokuyama Corporation.

The BET specific surface area of the chemically surface-treated silica is 50 to 250 $m^2/g$. If the BET specific surface area is smaller than 50 $m^2/g$, the resin composition has insufficient thixotropy, exhibits high stringiness during ejection, and flows out of the areas to which the composition has been applied. If the BET specific surface area is larger than 250 $m^2/g$, the composition negligibly flows after being applied but the ability to be ejected from an orifice is deteriorated to cause a decrease in workability. The BET specific surface area is preferably 80 to 230 $m^2/g$, more preferably 90 to 200 $m^2/g$, and particularly preferably 110 to 170 $m^2/g$.

Regarding (D), the pH at 23° C. of a 40 g/L silica dispersion prepared using a 50 vol % methanol/ion exchange water solution is 5.0 to 9.0. On the surface of an untreated silica, many silanol groups usually remain, making the pH of an aqueous dispersion acidic. The surface of the silica is chemically treated and thereby the number of silanol groups is reduced so as to bring the pH of an aqueous dispersion of the silica to 5.0 to 9.0. This control probably contributes to the manifestation of thixotropy of the resin composition, and effectively works to suppress the flow of the composition out of the areas to which it has been applied. The pH is preferably 5.5 to 9.0, and more preferably 6.0 to 9.0.

The method for chemically treating the silica surface is not particularly limited as long as the pH at 23° C. of a 40 g/L silica dispersion prepared using a 50 vol % methanol/ion exchange water solution is brought to 5.0 to 9.0. Examples of the surface treatments include treatments with silazane compounds (such as hexamethyldisilazane, 1,3-divinyl-1,1, 3,3-tetramethyldisilazane, 1,3-bis(chloromethyl)tetramethyldisilazane, 1,3-bis(3,3,3-trifluoropropyl)-1,1,3,3-tetramethyldisilazane, 1,3-diphenyltetramethyldisilazane, heptamethyldisilazane, 2,2,4,4,6,6-hexamethylcyclotrisilazane, octamethylcyclotetrasilazane, 1,1,3,3-tetramethyldisilazane and 2,4,6-trimethyl-2,4,6-trivinylcyclotrisilazane), alkoxysilane compounds (such as methyltrimethoxysilane, dimethyldimethoxysilane, methyltriethoxysilane, dimethyldiethoxysilane, n-propyltrimethoxysilane, n-propyltriethoxysilane, phenyltrimethoxysilane, phenyltriethoxysilane, hexyltrimethoxysilane, hexyltriethoxysilane, octyltrimethoxysilane, octyltriethoxysilane, decyltrimethoxysilane and hexadecyltrimethoxysilane), chlorosilane compounds (such as methyltrichlorosilane, dimethyldichlorosilane and trimethylchlorosilane), octamethylcyclotetrasiloxane and dimethylsiloxane oligomers. Of these, chemical treatment with a silazane compound or with an alkoxysilane compound having a linear or branched alkyl group with 6 to 18 carbon atoms is advantageous in that the pH of the silica dispersion can be brought to the desired range at a small dose of treatment. In particular, hexamethyldisilazane and octyltrimethoxysilane are preferable. From the points of view of the degree of treatment and the stability (inactivity) of the surface state after the treatment, hexamethyldisilazane is preferable. The surface treatment agent may be added together with the silica during the preparation of the resin composition so that the silica will be surface treated while the mixture is kneaded. Alternatively, a commercial material may be used.

The carbon content in (D) is preferably 2.0 to 10.0 mass %, and more preferably 2.5 to 8.0 mass %. When this content is met, the pH of an aqueous dispersion of the silica is controlled to fall in the desired range with ease. In the case where the silica is treated with hexamethyldisilazane, the carbon content in the silica is preferably 2.0 to 5.0 mass %, more preferably 2.5 to 4.5 mass %, and particularly preferably 3.0 to 4.3 mass %. The carbon content in the silica is a value calculated by perfectly burning the silica at 800° C., and detecting and quantitatively determining carbon dioxide in the combustion gas by TCD gas chromatography.

The component (D) may be used singly, or two or more may be used in combination.

The resin composition comprises (E) a polyoxyalkylene glycol in which an alkylene unit is a linear or branched alkylene group having 2 to 4 carbon atoms, and/or a derivative of the polyoxyalkylene glycol. The component (E), in combination with the chemically surface-treated silica (D), controls the thixotropy of the resin composition and plays an important role in balancing the ability of the composition to be ejected to the target areas, with the suppression of the flow out of the applied areas.

Examples of the polyoxyalkylene glycols and/or derivatives thereof include polyoxyalkylene glycols, polyoxyalkylene alkyl ethers and polyoxyalkylene fatty acid esters. In the derivatives of polyoxyalkylene glycols, substitution may be present on one or both of the terminal hydroxyl groups, and is preferably present on only one terminal because such derivatives have high interaction with silica and allow the thixotropy of the resin composition to be controlled easily. Although the number of carbon atoms in the terminal substituents is not particularly limited, linear or branched alkyl groups having 1 to 4 carbon atoms are preferable because they have high interaction with silica and allow the thixotropy of the resin composition to be controlled easily.

The number average molecular weight of the polyoxyalkylene glycol and/or the derivative thereof (E) is preferably 500 to 10,000, more preferably 600 to 8,000, still more preferably 800 to 6,000, and particularly preferably 800 to 4,000. The number average molecular weight in this range ensures that the composition tends to exhibit low stringiness and retain the shape satisfactorily after being applied.

In particular, the component (E) is preferably a polyoxyalkylene glycol for the reason that the resin composition exhibits low stringiness during ejection. Polyoxyethylene glycol or polyoxypropylene glycol is more preferable, and, from the point of view of the moisture proofness of the coating, polyoxypropylene glycol is particularly preferable. The plurality of alkylene groups may be the same as or different from each other, but preferably include at least a propylene group.

The component (E) may be used singly, or two or more may be used in combination.

To ensure that cured products will have appropriate hardness and elasticity, the ratio (HS/ViB) of HS to ViB is 0.45 to 2.00, preferably 0.50 to 1.80, more preferably 0.60 to 1.50, and particularly preferably 0.80 to 1.40 wherein HS is the number of mercaptoalkyl groups bonded to silicon atoms in (A) and ViB is the number of aliphatic unsaturated groups in (B). When the component (B) includes (B1) alone, the number of aliphatic unsaturated groups in (B) is equal to the number ViB1 of aliphatic unsaturated groups in (B1). When the components (B1) and (B2) are used in combination, the number of aliphatic unsaturated groups in (B) is the total of the number ViB1 of aliphatic unsaturated groups in (B1) and the number ViB2 of aliphatic unsaturated groups in (B2).

From the points of view of a photoreaction initiating action and heat resistance during curing, the amount of (C) is preferably 0.05 to 50 parts by mass, more preferably 0.1 to 40 parts by mass, still more preferably 0.2 to 10 parts by mass, and particularly preferably 0.3 to 5 parts by mass relative to 100 parts by mass of (B).

The content of (D) in the resin composition is 0.5 to 26 parts by mass relative to 100 parts by mass of (B). If the content of (D) is less than 0.5 parts by mass, no effects are obtained in enhancing the thixotropy of the resin composition. If the content of (D) is larger than 26 parts by mass, the resin composition exhibits poor ejectability and fails to attain sufficient workability. The content of (D) is preferably 4 to 23 parts by mass, more preferably 8 to 20 parts by mass, still more preferably 11 to 20 parts by mass, and particularly preferably 14 to 20 parts by mass.

The proportion of the content of (E) in the resin composition is 0.001 to 1.0 mass % relative to the total mass of (A) to (E). If the proportion of the content of (E) is less than 0.001 mass %, no effects are obtained in enhancing the thixotropy of the resin composition. If the proportion of the content of (E) is above 1.0 mass %, the resin composition comes to have a markedly low fluidity and may fail to fill gaps sufficiently without clearance when ejected between small parts. The proportion of the content of (E) is preferably 0.002 to 0.5 mass %, and more preferably 0.003 to 0.1 mass %.

It is preferable that the resin composition further comprises (F) an aliphatic unsaturated group-containing silane coupling agent. In this case, the adhesion/bonding properties of cured products to substrates can be advantageously enhanced. Examples and preferred examples of the aliphatic unsaturated groups in the aliphatic unsaturated group-containing silane coupling agents (F) include those aliphatic unsaturated groups mentioned for (B1).

The aliphatic unsaturated group-containing silane coupling agent (F) may be one or more selected from the group consisting of 3-methacryloxypropyltriethoxysilane, 3-methacryloxypropyltrimethoxysilane, vinyltrimethoxysilane, vinyltriethoxysilane, trimethoxysilylpropyldiallyl isocyanurate, bis(trimethoxysilylpropyl)allyl isocyanurate, triethoxysilylpropyldiallyl isocyanurate and bis(triethoxysilylpropyl)allyl isocyanurate, and is preferably 3-methacryloxypropyltriethoxysilane and/or 3-methacryloxypropyltrimethoxysilane. The aliphatic unsaturated group-containing silane coupling agent (F) may be used singly, or two or more may be used in combination.

From the point of view of the adhesion/bonding properties of cured products to substrates, the ratio (HS/ViF) of HS to ViF is 1.0 to 10.0, preferably 1.5 to 7.0, and more preferably 1.8 to 5.0 wherein HS is the number of mercaptoalkyl groups bonded to silicon atoms in (A) and ViF is the number of aliphatic unsaturated groups in the aliphatic unsaturated group-containing silane coupling agent (F).

To ensure that cured products will have appropriate hardness and elasticity and also from the point of view of the adhesion/bonding properties of cured products to substrates, the ratio (HS/(ViB+ViF)) of HS to the total of ViB and ViF is preferably 0.4 to 1.5, more preferably 0.5 to 1.4, and still more preferably 0.6 to 1.3 wherein HS is the number of mercaptoalkyl groups bonded to silicon atoms in (A), ViB is the number of aliphatic unsaturated groups in (B), and ViF is the number of aliphatic unsaturated groups in the aliphatic unsaturated group-containing silane coupling agent (F).

The resin composition may further comprise a silicone resin-based bonding improver (with the proviso that the components (A), (B) and the aliphatic unsaturated group-containing silane coupling agent (F) are excluded). The silicone resin-based bonding improver is a silicone resin having an adhesive property, and is added as required to further increase and stabilize the bonding of cured products of the resin composition.

From the points of view of the adhesive property and economic efficiency, the silicone resin-based bonding improver is preferably one or more silicone resin-based bonding improvers selected from the group consisting of MQ resins, MDQ resins, MT resins, MDT resins, MDTQ resins, DQ resins, DTQ resins and TQ resins (with the proviso that the resins do not contain aliphatic unsaturated groups or mercapto groups). From the points of view of fluidity and ease of synthesis, the silicone resin-based bonding improver is more preferably one or more selected from the group consisting of MQ resins, MDQ resins, MDT resins and MDTQ resins, still more preferably one or more silicone resin-based bonding improvers selected from the group consisting of MQ resins, MDQ resins and MDT resins, and particularly preferably an MQ resin because of its high adhesive property and easy control of the structure.

The symbols used to name the above resins indicate siloxane bond units wherein M: $(CH_3)_3SiO_{1/2}$, D: $(CH_3)_2SiO_{2/2}$, T: $(CH_3)SiO_{3/2}$, and Q: $SiO_{4/2}$. By MQ resins, it is meant that the resins includes M units and Q units. The same applies to the other resins such as MDQ resins.

The weight average molecular weight of the silicone resin-based bonding improver is preferably 2,000 to 100,000, more preferably 5,000 to 80,000, and still more preferably 10,000 to 60,000. Here, the weight average molecular weight is a value determined by gel permeation chromatography (GPC) using a polystyrene calibration curve.

The silicone resin-based bonding improver may be used in an amount of not more than 100 parts by mass relative to 100 parts by mass of (B). To enhance the adhesion to substrates, the amount of the silicone resin-based bonding improver is preferably 5 to 50 parts by mass, more preferably 5 to 30 parts by mass, and still more preferably 5 to 20 parts by mass.

While still achieving the advantageous effects of the invention, the resin composition may contain additives such as silane coupling agents other than the aliphatic unsaturated group-containing silane coupling agents (F), inorganic fillers other than silicas, polymerization inhibitors, antioxidants, light stabilizers, and UV absorbers that are light resistance stabilizers. While still achieving the advantageous effects of the invention, the resin composition may contain or may not contain an aliphatic unsaturated group-containing polyorganosiloxane other than (B) (for example, a branched polyorganosiloxane containing two or less aliphatic unsaturated groups).

Examples of the silane coupling agents include 3-aminopropyltriethoxysilane, 3-aminopropyltrimethoxysilane, 3-mercaptopropyltriethoxysilane, 3-mercaptopropyltrimethoxysilane, 3-glycidoxypropyltrimethoxysilane, 3-glycidoxypropyltriethoxysilane, tris(trimethoxysilylpropyl) isocyanurate and tris(triethoxysilylpropyl) isocyanurate.

Examples of the polymerization inhibitors (G) include hydroquinone, p-methoxyphenol, t-butylcatechol and phenothiazine. The polymerization inhibitor may be used singly, or two or more may be used in combination.

The antioxidants may be used to prevent the oxidation of cured products of the composition, and to improve weather resistance. Examples thereof include hindered amine-based antioxidants and hindered phenol-based antioxidants. Examples of the hindered amine-based antioxidants include, but are not limited to, N,N',N",N'''-tetrakis-(4,6-bis(butyl-(N-methyl-2,2,6,6-tetramethylpiperidin-4-yl)amino)-triazin-2-yl)-4,7-diazadecane-1,10-diamine, polycondensation product of dibutylamine/1,3,5-triazine/N,N'-bis-(2,2,6,6-tetramethyl-4-piperidyl)-1,6-hexamethylenediamine/N-(2,2,6,6-tetramethyl-4-piperidyl)butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino)}], polymer of dimethyl succinate and 4-hydroxy-2,2,6,6-tetramethyl-1-piperidine ethanol, [reaction product (70%) of bis(2,2,6,6-tetramethyl-1 (octyloxy)-4-piperidyl) decanedioate, 1,1-dimethylethyl hydroperoxide and octane]-polypropylene (30%), bis(1,2,2,6,6-pentamethyl-4-piperidyl)[[3,5-bis(1,1-dimethylethyl)-4-hydroxyphenyl]methyl]butyl malonate, methyl 1,2,2,6,6-pentamethyl-4-piperidyl sebacate, bis(2,2,6,6-tetramethyl-4-piperidyl) sebacate, bis(1,2,2,6,6-pentamethyl-4-piperidyl) sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, and 8-acetyl-3-dodecyl-7,7,9,9-tetramethyl-1,3,8-triazaspiro[4.5]decane-2,4-dione.

Examples of the hindered phenol-based antioxidants include, but are not limited to, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenyl)propionamide], 3,5-bis(1,1-dimethylethyl)-4-hydroxy C7-C9 side chain alkyl benzenepropanoate, 2,4-dimethyl-6-(1-methylpentadecyl)phenol, diethyl[[3,5-bis(1,1-dimethylethyl)-4-hydroxyphenyl]methyl]phosphonate, 3,3',3',5,5',5"-hexane-tert-butyl-4-a,a',a"-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl) propionate], hexamethylenebis[3-(3,5-di-tert-butyl-4-hydroxyphenyl) propionate], 1,3,5-tris(3,5-di-tert-butyl-4-hydroxybenzyl)-1,3,5-triazine-2,4,6-(1H,3H,5H)-trione, reaction product of N-phenylbenzeneamine and 2,4,4-trimethylpentene, and 2,6-di-tert-butyl-4-(4,6-bis(octylthio)-1,3,5-triazin-2-ylamino)phenol. The antioxidant may be used singly, or two or more may be used in combination.

The light stabilizers may be used to prevent the photo-oxidative degradation of cured products. Examples thereof include benzotriazole-based compounds, hindered amine-based compounds and benzoate-based compounds. The UV absorbers that are light resistance stabilizers may be used to prevent light degradation and to improve weather resistance. Examples thereof include such UV absorbers as benzotriazole-based compounds, triazine-based compounds, benzophenone-based compounds and benzoate-based compounds. Examples of the UV absorbers include, but are not limited to, benzotriazole-based UV absorbers such as 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, reaction product of methyl 3-(3-(2H-benzotriazol-2-yl)-5-tert-butyl-4-hydroxyphenyl)propionate/polyethylene glycol 300, and 2-(2H-benzotriazol-2-yl)-6-(linear and branched dodecyl)-4-methylphenol, triazine-based UV absorbers such as 2-(4,6-diphenyl-1,3,5-triazin-2-yl)-5-[(hexyl)oxy]-phenol, benzophenone-based UV absorbers such as octabenzone, and benzoate-based UV absorbers such as 2,4-di-tert-butylphenyl-3,5-di-tert-butyl-4-hydroxybenzoate. The UV absorber may be used singly, or two or more may be used in combination. Hindered amine-based light stabilizers are preferable. In particular, the use of a tertiary amine-containing hindered amine-based light stabilizer is preferable to improve the storage stability of the composition. Examples of the tertiary amine-containing hindered amine-based light stabilizers include such light stabilizers as TINUVIN 622LD, TINUVIN 144 and CHIMASSORB 119FL (all manufactured by BASF SE); MARK LA-57, LA-62, LA-67 and LA-63 (all manufactured by ADEKA CORPORATION); and SANOL LS-765, LS-292, LS-2626, LS-114 and LS-744 (all manufactured by Sankyo Co., Ltd.).

To reduce stringiness, to enhance workability by ensuring ejectability, and to restrain an undesired flow after being applied, the viscosity of the resin composition at 23° C. is 500 to 100,000 cP. Here, the viscosity is a value measured using a rotational viscometer (VISMETRON VDH) (manufactured by SHIBAURA SYSTEMS CO., LTD.) at a rotational speed of 20 rpm with No. 6 rotor in the range of not more than 20,000 cP or with No. 7 rotor in the range of above 20,000 cP. The viscosity of the resin composition is preferably 2,000 to 80,000 cP, and more preferably 5,000 to 60,000 cP.

The resin composition preferably has a thixotropy ratio of 1.55 to 1.68, wherein the thixotropy ratio is represented by the formula $V_{10rpm}/V_{20rpm}$, wherein $V_{20rpm}$ is the viscosity measured at 23° C. and a rotational speed of 20 rpm, and $V_{10rpm}$ is the viscosity measured at a rotational speed of 10 rpm using the same rotor as the measurement at a rotational speed of 20 rpm. When the thixotropy ratio is in this range, stringiness is reduced and ejectability is ensured with ease, and it is also possible to restrain an undesired flow after being applied. The thixotropy ratio is more preferably 1.56 to 1.67, and still more preferably 1.57 to 1.66.

The resin composition is obtained by blending the components (A) to (E) together, optionally with the aliphatic unsaturated group-containing silane coupling agent (F) and various additives. The preparation method is not particularly limited. For example, the composition may be preferably prepared as described below. The components (B), (D) and (E) are mixed uniformly while heating as required, and the component (A) is added thereto and mixed uniformly. Thereafter, the aliphatic unsaturated group-containing silane coupling agent (F), which is an optional component, is added and the resultant mixture is mixed uniformly, and the component (C) and an optional polymerization inhibitor are added in the absence of UV rays. For example, the components (B) and (D) are put in a universal mixing stirring machine and mixed together at a low speed uniformly at room temperature (10 to 30° C.) and thereafter, as required, the mixture is mixed while heating at, for example, 120° C. The component (E) may be added at the same time as (B) and (D) or may be added at any point of time in the above step. Thereafter, the component (A) is added and the resultant mixture is mixed, and the component (C) and additives such as a polymerization inhibitor are added in the absence of UV rays. The resultant mixture is mixed uniformly at a low speed and at a reduced pressure while cooling with ice water (10° C. or below), and is then degassed, and is filtered as required. The resin composition may be thus obtained.

The resin composition may be cured by the application of UV rays. Exemplary lamps having a wavelength region which can activate the component (C) include a high-pressure mercury lamp (UV-7000) and metal halide lamps (MHL-250, MHL-450, MHL-150 and MHL-70) manufactured by USHIO INC., a metal halide lamp (JM-MTL 2KW) manufactured by JM tech Co. Ltd., South Korea, a UV illumination lamp (OSBL360) manufactured by Mitsubishi Electric Corporation, a UV illuminator (UD-20-2) manufactured by Japan Storage Battery Co., Ltd., a fluorescent lamp (FL-20BLB) manufactured by Toshiba Corporation, and H Bulb, H Plus Bulb, D Bulb, Q Bulb and M Bulb manufactured by Fusion UV Systems, Inc. The irradiation dose is preferably 100 to 10,000 mJ/cm$^2$, more preferably 300 to 5,000 mJ/cm$^2$, and still more preferably 500 to 3,500 mJ/cm$^2$.

The resin composition may be used as a coating agent, a potting agent or a liquid gasket agent that protects electric/electronic components from soil, water, moisture and the like. The resin composition may be used as a coating agent, a potting agent or a liquid gasket agent in a manner that is conventionally known. For example, the resin composition may be applied to an electric/electronic component so as to coat or pot an area where protection is needed, and thereafter the resin composition may be dried as required and irradiated with UV rays to cure.

The present invention also pertains to an electric/electronic component protected using the resin composition. Examples of the electric/electronic components include semiconductor devices, printed circuit boards and battery materials.

The resin compositions and cured products thereof have favorable properties described below.

[Thickness]

The thickness in which the resin composition is applied is not particularly limited, but is preferably 0.05 to 5 mm, and more preferably 0.1 to 5 mm.

[E Hardness after Curing]

The resin composition can attain an E hardness of 30 to 70 after being cured and is thus advantageous in that it can relax an external stress appropriately with ease and can constrain the penetration of water even under high temperature and high humidity environment. The E hardness is preferably 40 to 65, and more preferably 50 to 60.

[Elongation after Curing]

The resin composition can attain an elongation of 30% or above after being cured and is thus advantageous in that it excellently relaxes an external stress and can ensure deformation resistance. The elongation after curing is preferably 35% or above, more preferably 40% or above, and still more preferably 50% or above.

[Fluidity]

The resin composition, when applied in a constant thickness onto a surface such as a substrate, is required to scarcely flow out of the area to which it has been applied. In the present specification, two types of fluidity evaluation methods are used as an indicator of fluidity, one being a vertical slump test in accordance with JIS A1439 and the other being a test which evaluates fluidity with a jig used in ASTM D2202 slump test, the jig being arranged horizontally. Details of the test methods will be described in Examples.

[Ejectability]

The resin composition is used by being applied to a predetermined area of a surface such as a substrate using, for example, an ejection nozzle of a dispensing machine (the nozzle may be selected appropriately, for example, 18 G, in accordance with the discharge amount). A larger discharge amount from the ejection nozzle allows the treatment speed to be increased and is thus preferable. The ejectability is evaluated based on the amount discharged for 10 seconds using an 18 G needle. The discharge amount is preferably not less than 0.4 g, more preferably not less than 0.5 g, and still more preferably not less than 0.7 g.

[Over-Time Stability]

The resin composition is preferably free from a change in ejectability before and after storage. In the present specification, the indicator of the over-time stability of the resin composition is ejectability evaluated 4 weeks after the production of the resin composition. The evaluation criteria are the same as those for the ejectability.

[Stringiness]

If the resin composition remains at the tip of a needle after the composition has been ejected from an ejection nozzle of a dispensing machine, there is a risk that the resin composition may drip and attach to undesired areas. Further, the treatment speed may have to be lowered to prevent the resin composition remaining at the tip of the needle from attaching to undesired areas. In the present specification, the length of the resin composition remaining at the tip of the needle is measured in 0.5 mm increments after the aforementioned test of ejectability, and the length obtained is used as an indicator of stringiness. The stringiness is acceptable for practical use when the length is 3.0 mm or less and is favorable when the length is 1.0 mm or less.

EXAMPLES

Hereinbelow, the present invention will be described in greater detail by presenting Examples and Comparative Examples. Parts and % indicate parts by mass and mass % unless otherwise mentioned. The present invention is not limited to Examples given below. Compositions prepared in Examples and Comparative Examples were cured using UVL-4001M manufactured by USHIO INC., at a UV energy of 120 w/cm$^2$ and a cumulative dose of 3,000 mJ/cm$^2$.

[Properties Evaluation Conditions]

(1) Measurement of Number of Mercapto Groups

The number of mercapto groups per unit mass of a polyorganosiloxane (A) containing a mercaptoalkyl group bonded to a silicon atom was determined by colorimetric titration using a 1/10 N iodine solution (a special grade reagent) as an iodine source.

Calculation method: SH content (mmol/g)=$(A \times P \times 0.1)/(W \times C)$

A: The volume (mL) of the iodine solution dropped until a color change occurred.

P: The factor of the iodine solution (the factor described on the reagent), given when correction was necessary.

W: Mass (g) of the sample

C: The nonvolatile content (%) in the sample

The amount of the iodine solution was determined by performing a preliminary measurement. The measurement was thereafter made with good precision three times, and the results of the three measurements were averaged.

(2) Measurement of Number of Aliphatic Unsaturated Groups

The number of aliphatic unsaturated groups in a polyorganosiloxane (B1) was calculated in the following manner. NMR peaks were assigned to Si—CH$_3$ (near 0.1 ppm), Si-Ph (Ph means a phenyl group) (near 7.3-7.7 ppm) and Si—CH=CH$_2$ (near 5.7-6.3 ppm) and were deemed to correspond to (CH$_3$)$_2$SiO$_{2/2}$ units, Ph$_2$-SiO$_{2/2}$ units and (CH$_3$)$_2$Si—CH=CH$_2$O$_{1/2}$ units, respectively. The numbers of the respective units were determined by the ratio of the peak intensities, and the average structural formula and the molecular weight thereof were determined, and the number of aliphatic unsaturated groups in the polyorganosiloxane (B1) was calculated.

The number of aliphatic unsaturated groups in a polyorganosiloxane (B2) was calculated in the similar manner. NMR peaks were assigned to Si—CH$_3$ (near 0.1 ppm), Si-Ph (near 7.3-7.7 ppm) and Si—CH=CH$_2$ (near 5.2-6.2 ppm) and were deemed to correspond to (CH$_3$)$_2$SiO$_{2/2}$ units, Ph$_2$-SiO$_{2/2}$ units and (CH$_3$)Si—CH=CH$_2$O$_{2/2}$ units, respectively. The numbers of the respective units were determined by the ratio of the peak intensities, and the average structural formula and the molecular weight thereof were determined, and the number of aliphatic unsaturated groups in the polyorganosiloxane (B2) was calculated.

(3) Viscosity 1

Each viscosity of polyorganosiloxanes (A) and (B1) was measured in the following manner.

The viscosity was measured using a rotational viscometer (VISMETRON VDA-L) (manufactured by SHIBAURA SYSTEMS CO., LTD.) with No. 2 rotor at 60 rpm in the range of 400 cP and below, with No. 3 rotor at 60 rpm in the range of more than 400 to 1,500 cP, with No. 4 rotor at 60 rpm in the range of more than 1,500 cP to 10,000 cP, with No. 4 rotor at 30 rpm in the range of more than 10,000 to 20,000 cP, and with No. 4 rotor at 12 rpm in the range of more than 20,000 cP. The measured values are values at 23° C.

(4) Viscosity 2

The viscosity of a resin composition was measured in the following manner.

The viscosity was measured using a rotational viscometer (VISMETRON VDH) (manufactured by SHIBAURA SYSTEMS CO., LTD.) at 20 rpm with No. 6 rotor in the range of not more than 20,000 cP or with No. 7 rotor in the range of above 20,000 cP. The thixotropy ratio of the resin composition was determined from the formula V$_{10rpm}$/V$_{20rpm}$, wherein V$_{20rpm}$ was the viscosity measured at a rotational speed of 20 rpm and V$_{10rpm}$ was the viscosity measured at a rotational speed of 10 rpm using the same rotor as the measurement at a rotational speed of 20 rpm. The measured values are values at 23° C.

(5) E Hardness after Curing

A resin composition was cured using UVL-4001M manufactured by USHIO INC., at a UV energy of 120 w/cm$^2$ and a cumulative dose of 3,000 mJ/cm$^2$, and a dumbbell-shaped test piece (a dumbbell No. 2) was fabricated in accordance with JIS K6250. The test piece thus-obtained was tested at 23° C. in accordance with JIS K6253E to measure the E hardness after curing.

(6) Elongation after Curing

A resin composition was cured using UVL-4001M manufactured by USHIO INC., at a UV energy of 120 w/cm$^2$ and a cumulative dose of 3,000 mJ/cm$^2$, and a dumbbell-shaped test piece (a dumbbell No. 2) was fabricated in accordance with JIS K6250. The test piece thus-obtained was tested at 23° C. using a Schopper tensile tester (manufactured by Toyo Seiki Seisaku-sho, Ltd.) in accordance with JIS K6251 to measure the elongation after curing.

(7) Specific Gravity

The specific gravity of a cured product of a resin composition was measured with an electronic densimeter (SD-120L manufactured by MIRAGE) at 23° C.

(8) Cohesive Failure Ratio

A resin composition was applied onto a 25 mm wide adherend so that the resin composition extended 25 mm in width and at least 10 mm in length with a thickness of 0.1 mm. A reinforced glass plate having a thickness of 2 mm and a width of 25 mm was superimposed on the composition over a width of 10 mm. The composition was cured by applying UV rays from the reinforced glass side at an energy of 3,000 mJ/cm$^2$, thus forming a sample.

1 day after its fabrication, the sample was subjected to a shear bond test in which it was pulled with use of an autograph manufactured by Shimadzu Corporation at a tensile rate of 10 mm/min during the measurement so as to separate the adherend and the glass plate from each other.

The cohesively failed area S mm$^2$ of the cured product of the resin composition on the adherend was measured. The cohesive failure ratio (%) was calculated using the formula:

$$(100 \times S)/(10 \times 25)$$

The closer the cohesive failure ratio is to 100%, the higher the bonding is.

(9) Fluidity 1

Fluidity 1 was evaluated by a vertical slump test in accordance with JIS A1439. The test was conducted in a 23° C. environment. A channel-shaped container was filled with a resin composition, wherein the channel-shaped container conformed to JIS A1439 except that each of the width and the depth of the channel-shaped container had been changed to 5 mm. The test piece was suspended vertically. After 30 minutes, the distance was measured in 0.5 mm increments between the lowermost end of the channel of the channel-shaped container and the tip of the resin composition on the slump. Fluidity 1 shows that a good balance of fluidity is attained when the distance is 3.0 mm or less, and the ejectability and the ability to retain the shape after being applied are particularly good when the distance is 1.0 to 2.0 mm. The fluidity was immeasurable if the resin composition had flowed out of the channel-shaped container beyond the measurement limit.

(10) Fluidity 2

Fluidity 2 was evaluated by a test using a jig that conformed to a jig described in ASTM D2202 slump test, the jig being arranged horizontally. The test was conducted in a 23° C. environment. The depth of the movable cavity of the flow jig with a diameter of 38.1 mm was set to 5 mm, and the cavity was filled with a resin composition. While keeping the jig horizontal, the bottom of the cavity was raised by 5 mm, and the resin composition was completely exposed to the outside of the cavity. After 1 hour, the farthest distance by which the resin composition had moved from the circumference of the cavity was measured in 0.5 mm increments. Fluidity 2 shows that the fluidity is acceptable for practical use when the distance is 0.5 mm or less, and the fluidity is good when the distance is 0 mm. The fluidity was immeasurable if the resin composition had flowed out of the measurement limit of the jig.

(11) Discharge Amount

A resin composition was ejected using a double thread screwed plastic needle (manufactured by Musashi Engineering, INC., needle length 12.7 mm, gauge: 18 G (inner diameter 0.84 mm, outer diameter 1.27 mm) for 10 seconds, and the mass (g) discharged was determined as the discharge amount. The discharge amount is acceptable for practical use when it is 0.4 g or more, and is preferably 0.5 g or more, and more preferably 0.7 g or more. The discharge amount of the resin composition was measured immediately after production and after 4 weeks of storage at room temperature.

(12) Stringiness

After the measurement of the discharge amount (9) of a resin composition immediately after production, the length of the resin composition remaining at the tip of the plastic needle was measured in 0.5 mm increments, thereby evaluating the stringiness. The stringiness is acceptable for practical use when the length is 3.0 mm or less, and is favorable when the length is 1.0 mm or less. The stringiness was immeasurable if the resin composition had dripped from the tip of the plastic needle after the measurement of the discharge amount and the length of the resin composition that had remained at the tip could not be measured.

Components (A) in Examples and Comparative Examples are Described Below.

(a-1) Polymethylsiloxane containing a mercaptopropyl group

A 5 L separable flask equipped with a cooling reflux tube, a dropping funnel and THREE-ONE MOTOR as a stirrer was loaded with 1,550 g (12 mol) of dimethyldichlorosilane, 22 g (0.2 mol) of trimethylchlorosilane, 196 g (1.0 mol) of 3-mercaptopropyltrimethoxysilane and 1,500 g of toluene. A mixture of 1,000 g of water and 500 g of toluene was added dropwise thereto through the dropping funnel over a period of about 1 hour. Hydrolysis was performed at 70° C. for 2 hours while performing heating and stirring. After the completion of the reaction, the aqueous phase was separated, and the residue was washed with water and dehydrated by being heated at 100° C. to 125° C. After the completion of the dehydration, 1.5 g of a 50% aqueous potassium hydroxide solution was added, and the mixture was heated and stirred at 115 to 125° C. for 5 hours, thereby performing a condensation reaction. After the reaction system was neutralized with ethylene chlorohydrin, 1,200 to 1,300 g of toluene was disposed of. The reaction system was then filtered with use of CELITE SUPER FLOSS as a filter aid. The residual toluene was removed at ambient pressure and reduced pressure. Consequently, 932 g of a mercaptopropyl group-containing polymethylsiloxane was obtained.

The average structural formula and properties of (a-1) are as follows.

Average structural formula:

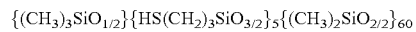

Viscosity: 230 cP; No. 2 rotor, 60 rpm

Number of mercapto groups per unit mass: 0.96 mmol/g (a-2) Polymethylsiloxane containing a mercaptopropyl group Component (a-2) was synthesized in the same manner as (a-1), except that the heating and stirring time was changed.

The polymethylsiloxane (a-2) was the same as (a-1) in average structural formula and was different therefrom in viscosity.

Properties of (a-2) are as follows.

Viscosity: 1090 cP; No. 3 rotor, 60 rpm

Number of mercapto groups per unit mass: 0.95 mmol/g

Components (B1) in Examples and Comparative Examples are described below.

Synthesis of Vinyl-Terminated Polymethylphenylsiloxane (b1-2)

A 3 L separable flask equipped with a cooling reflux tube and THREE-ONE MOTOR as a stirrer was loaded with 1,800 g of 1,1,3,3,5,5,7,7-octamethylcyclotetrasiloxane, 260 g of 1,1,3,3,5,5,7,7-octaphenylcyclotetrasiloxane and 7.6 g of 1,1,3,3-tetramethyl-1,3-divinyldisiloxane. The mixture was dehydrated by being heated and stirred at 150 to 160° C. for 3 hours while blowing nitrogen gas at 0.5 N m³/h. Subsequently, 0.1 g of potassium hydroxide was added, and the mixture was heated and stirred until the potassium hydroxide was dissolved uniformly in the flask and the viscosity was increased to 15,000 cP to 18,000 cP. Thereafter, the mixture was neutralized with 10 g of ethylene chlorohydrin at 100° C., filtered with use of CELITE SUPER FLOSS as a filter aid, and subjected to a reduced pressure of 2 mmHg at 170 to 180° C. to remove low-boiling fractions. Consequently, 1,832 g of a vinyl-terminated polymethylphenylsiloxane was obtained which had dimethylvinylsiloxy-blocked terminals and contained 5 mol % of diphenylsiloxy units and the balance of dimethylsiloxy units.

Components (b1-1), (b1-3) and (b1-4) were synthesized in the same manner as (b1-2), except that the heating and stirring time was changed. The average structural formulas and properties of (b1-1) to (b1-4) are described below.

(b1-1) Vinyl-terminated polymethylphenylsiloxane

Average structural formula according to NMR measurement:

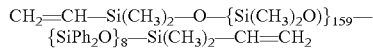

Average number of aliphatic unsaturated groups per molecule: 2

Viscosity: 1,050 cP; No. 3 rotor, 60 rpm

Molecular weight: 13,800

(b1-2) Vinyl-terminated polymethylphenylsiloxane

Average structural formula according to NMR measurement:

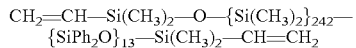

Average number of aliphatic unsaturated groups per molecule: 2

Viscosity: 3,280 cP; No. 4 rotor, 60 rpm

Molecular weight: 21,000

(b1-3) Vinyl-terminated polymethylphenylsiloxane

Average structural formula according to NMR measurement:

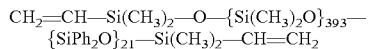

Average number of aliphatic unsaturated groups per molecule: 2

Viscosity: 11,050 cP; No. 4 rotor, 30 rpm

Molecular weight: 34,000

Synthesis of (b1-4)

Average structural formula according to NMR measurement:

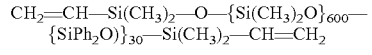

Average number of aliphatic unsaturated groups per molecule: 2

Viscosity: 20,450 cP; No. 4 rotor, 12 rpm

Molecular weight: 50,400

Component (B2) in Examples and Comparative Examples is described below.

Component (b2-1) was a $M_6D^{vi}Q_8$ resin with the average structural formula:

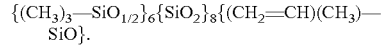

Weight average molecular weight: 22,450

The weight average molecular weight is a value determined by gel permeation chromatography (GPC) using a polystyrene calibration curve.

Components (C) in Examples and Comparative Examples are described below.

(c-1) 2-Hydroxy-2-methylpropiophenone
(c-2) 2,2-Dimethoxy-1,2-diphenylethan-1-one
(c-3) 1-Hydroxycyclohexyl phenyl ketone
(c-4) Bis(2,4,6-trimethylbenzoyl)-phenylphosphine oxide Components (D) in Examples and Comparative Examples are described below. The pH is a value of pH at 23° C. of a 40 g/L silica dispersion prepared using a 50 vol % methanol/ion exchange water solution.

(d-1) Silazane (hexamethyldisilazane)-treated fumed silica: BET specific surface area 137 m²/g, pH 6.8, carbon content 3.9 mass %

(d-2) Silazane (hexamethyldisilazane)-treated fumed silica: BET specific surface area 140 m²/g (AEROSIL RX200, manufactured by NIPPON AEROSIL CO., LTD.), pH 6.7, carbon content 2.6 mass %

(d-3) Silazane (hexamethyldisilazane)-treated fumed silica: BET specific surface area 200 m²/g (AEROSIL RX300, manufactured by NIPPON AEROSIL CO., LTD.), pH 7.0, carbon content 3.6 mass %

(d-4) Silazane (hexamethyldisilazane)-treated fumed silica: BET specific surface area 220 m²/g (AEROSIL R812S, manufactured by NIPPON AEROSIL CO., LTD.), pH 6.4, carbon content 3.5 mass %

(d-5) Silazane (hexamethyldisilazane)-treated fumed silica: BET specific surface area 260 m²/g (AEROSIL R812, manufactured by NIPPON AEROSIL CO., LTD.), pH 6.5, carbon content 2.4 mass %

(d-6) Silazane (hexamethyldisilazane)-treated fumed silica: BET specific surface area 160 m²/g, pH 5.6, carbon content 1.5 mass %

(d-7) Silazane (hexamethyldisilazane)-treated fumed silica: BET specific surface area 310 m²/g, pH 6.8, carbon content 3.5 mass %

(d-8) Untreated fumed silica: BET specific surface area 140 m²/g (AEROSIL 130, manufactured by NIPPON AEROSIL CO., LTD.), pH 4.1, carbon content 0 mass %

(d-9) Dimethyldichlorosilane-treated fumed silica: BET specific surface area 120 m²/g (AEROSIL R972, manufactured by NIPPON AEROSIL CO., LTD.), pH 4.9, carbon content 0.8 mass %

(d-10) Dimethyldichlorosilane-treated fumed silica: BET specific surface area 170 m²/g (AEROSIL R974, manufactured by NIPPON AEROSIL CO., LTD.), pH 4.7, carbon content 1.1 mass %
(d-11) Octamethylcyclotetrasiloxane-treated fumed silica: BET specific surface area 150 m²/g (AEROSIL R104, manufactured by NIPPON AEROSIL CO., LTD.), pH 4.7, carbon content 1.4 mass %
(d-12) Silicone oil-treated fumed silica: BET specific surface area 110 m²/g (AEROSIL RY200, manufactured by NIPPON AEROSIL CO., LTD.), pH 5.2, carbon content 5.2 mass %
(d-13) Silazane (hexamethyldisilazane)-treated fumed silica: BET specific surface area 40 m²/g (AEROSIL NAX50, manufactured by NIPPON AEROSIL CO., LTD.), pH 6.8, carbon content 0.7 mass %
(d-14) Octyltrimethoxysilane-treated fumed silica: BET specific surface area 150 m²/g (AEROSIL R805, manufactured by NIPPON AEROSIL CO., LTD.), pH 4.7, carbon content 5.4 mass %
(d-15) Octyltrimethoxysilane-treated fumed silica: BET specific surface area 93 m²/g (AEROSIL VP NKC130, manufactured by NIPPON AEROSIL CO., LTD.), pH 6.8, carbon content 8.8 mass %
(d-16) Hexadecyltrimethoxysilane-treated fumed silica: BET specific surface area 180 m²/g (AEROSIL R816, manufactured by NIPPON AEROSIL CO., LTD.), pH 4.6, carbon content 1.3 mass %

Components (E) in Examples and Comparative Examples are described below.
(e-1) Polypropylene glycol (number average molecular weight: 1,000): SANNIX PP-1000 (manufactured by Sanyo Chemical Industries, Ltd.)
(e-2) Polypropylene glycol (number average molecular weight: 2,000): SANNIX PP-2000 (manufactured by Sanyo Chemical Industries, Ltd.)
(e-3) Polypropylene glycol (number average molecular weight: 3,000): SANNIX PP-3000 (manufactured by Sanyo Chemical Industries, Ltd.)
(e-4) Polyethylene glycol (number average molecular weight: 1,000): PEG-1000 (manufactured by Sanyo Chemical Industries, Ltd.)
(e-5) Diethylene glycol dimethyl ether: reagent: B0498 (manufactured by Tokyo Chemical Industry Co., Ltd.)
(e-6) Polyalkylene glycol derivative (water-insoluble type): UNILUB MB-38 (manufactured by NOF CORPORATION)
(e-7) Polypropylene glycol (number average molecular weight: 200): SANNIX PP-200 (manufactured by Sanyo Chemical Industries, Ltd.)

Aliphatic unsaturated group-containing silane coupling agent (F) in Examples and Comparative Examples is 3-methacryloxypropyltrimethoxysilane (f-1).

A polymerization inhibitor in Examples and Comparative Examples is p-t-butylcatechol (g-1).

Example 1

A 5 L universal mixing stirring machine (manufactured by Dalton Co., Ltd.) was loaded with 41.3 parts by mass (413 g) of the vinyl-terminated polymethylphenylsiloxane (b1-2), 13.1 parts by mass (131 g) of the $M_6D^{vi}Q_8$ resin (b2-1), and 19.2 parts by mass (192 g) of the silazane (hexamethyldisilazane)-treated fumed silica (d-1). The mixture was mixed uniformly at room temperature (22° C.) under low-speed lever rotation conditions for 30 minutes. To the homogeneous mixture was added 58.7 parts by mass (587 g) of the vinyl-terminated polymethylphenylsiloxane (b1-1), and the mixture was mixed uniformly. The resultant mixture was mixed for 2 hours while heating at 120° C. After cooling, 35.6 parts by mass (356 g) of the mercaptopropyl group-containing polymethylsiloxane (a-1) was added, and the mixture was mixed uniformly. Further, while blocking UV rays, there were added 0.07 parts by mass (0.7 g) of p-t-butylcatechol (g-1), a mixture solution including 0.77 parts by mass (7.7 g) of 2-hydroxy-2-methylpropiophenone (c-1) and 0.39 parts by mass (3.9 g) of 2,2-dimethoxy-1,2-diphenylethan-1-one (c-2), 2.34 parts by mass (23.4 g) of 3-methacryloxypropyltrimethoxysilane (f-1) and 0.0084 parts by mass (0.084 g) of polypropylene glycol (e-2) (SANNIX PP-2000, manufactured by Sanyo Chemical Industries, Ltd.). The resultant mixture was mixed uniformly under reduced pressure for 30 minutes while cooling with ice water (8° C.) under low-speed lever rotation conditions. Thereafter, unwanted substances such as foreign substances were removed through a 200-mesh metal screen that had been washed. A resin composition was thus obtained.

In the same manner as in Example 1, compositions of Examples and Comparative Examples were prepared using the formulations described in Tables 1, 3, 5, 7 and 9, and their properties were evaluated. The results are described in Tables 2, 4, 6, 8 and 10.

TABLE 1

| | Product name | Example 1 | Example 2 | Example 3 | Example 4 | Example 5 | Example 6 | Example 7 | Example 8 |
|---|---|---|---|---|---|---|---|---|---|
| (a-1) | Mercaptopropyl group-containing polymethylsiloxane (230 cP) | 21.2 | 21.2 | 21.2 | 21.2 | 21.2 | 21.2 | 21.2 | |
| (a-2) | Mercaptopropyl group-containing polymethylsiloxane (1090 cP) | | | | | | | | 21.2 |
| (b1-1) | Vinyl-terminated polymethylphenylsiloxane (105 cP) | 34.9 | 34.9 | 34.9 | 34.9 | 34.9 | 34.9 | | 34.9 |
| (b1-2) | Vinyl-terminated polymethylphenylsiloxane (3280 cP) | 24.6 | 24.6 | 24.6 | 24.6 | 24.6 | 24.6 | | 24.6 |
| (b1-3) | Vinyl-terminated polymethylphenylsiloxane (11050 cP) | | | | | | | 59.5 | |
| (b2-1) | $M_6D^{vi}Q_8$ resin | 7.8 | 7.8 | 7.8 | 7.8 | 7.8 | 7.8 | 7.8 | 7.8 |
| (c-1) | 2-Hydroxy-2-methylpropiophenone | 0.46 | 0.46 | 0.46 | 0.46 | 0.46 | 0.46 | 0.46 | 0.46 |

TABLE 1-continued

|  |  | Product name | Example 1 | Example 2 | Example 3 | Example 4 | Example 5 | Example 6 | Example 7 | Example 8 |
|---|---|---|---|---|---|---|---|---|---|---|
| (c-2) | 2,2-Dimethoxy-1,2-diphenylethan-1-one |  | 0.23 | 0.23 | 0.23 | 0.23 | 0.23 | 0.23 | 0.23 | 0.23 |
| (d-1) | Silazane-treated fumed silica (BET specific surface area 137 $m^2/g$) |  | 11.4 |  |  |  |  |  | 11.4 | 11.4 |
| (d-2) | Silazane-treated fumed silica (BET specific surface area 140 $m^2/g$) | AEROSIL RX200 |  | 11.4 |  |  |  |  |  |  |
| (d-3) | Silazane-treated fumed silica (BET specific surface area 200 $m^2/g$) | AEROSIL RX300 |  |  | 11.4 |  |  |  |  |  |
| (d-4) | Silazane-treated fumed silica (BET specific surface area 220 $m^2/g$) | AEROSIL R812S |  |  |  | 11.4 |  |  |  |  |
| (d-6) | Silazane-treated fumed silica (BET specific surface area 160 $m^2/g$) |  |  |  |  |  | 11.4 |  |  |  |
| (d-15) | Octyltrimethoxysilane-treated fumed silica (BET specific surface area 93 $m^2/g$) | AEROSIL VP NKC130 |  |  |  |  |  | 11.4 |  |  |
| (e-2) | Polypropylene glycol (2000) | SANNIX PP-2000 | 0.005 | 0.005 | 0.005 | 0.005 | 0.005 | 0.005 | 0.005 | 0.005 |
| (f-1) | 3-Methacryloxypropyltrimethoxysilane |  | 1.4 | 1.4 | 1.4 | 1.4 | 1.4 | 1.4 | 1.4 | 1.4 |
| (g-1) | P-t-butylcatechol |  | 0.04 | 0.04 | 0.04 | 0.04 | 0.04 | 0.04 | 0.04 | 0.04 |
| HS: | Number in mmol of mercaptoalkyl groups in (A) |  | 20.36 | 20.36 | 20.36 | 20.36 | 20.36 | 20.36 | 20.36 | 20.15 |
| ViB1: | Number in mmol of aliphatic unsaturated groups in (B1) |  | 7.40 | 7.40 | 7.40 | 7.40 | 7.40 | 7.40 | 3.51 | 7.40 |
| ViB2: | Number in mmol of aliphatic unsaturated groups in (B2) |  | 7.85 | 7.85 | 7.85 | 7.85 | 7.85 | 7.85 | 7.85 | 7.85 |
| ViB: | Number in mmol of aliphatic unsaturated groups in (B) |  | 15.25 | 15.25 | 15.25 | 15.25 | 15.25 | 15.25 | 11.36 | 15.25 |
| Proportion (%) of aliphatic unsaturated groups in (B2) relative to aliphatic unsaturated groups in (B) |  |  | 51.5% | 51.5% | 51.5% | 51.5% | 51.5% | 51.5% | 69.1% | 51.5% |
| ViF: | Number in mmol of aliphatic unsaturated groups in (F) |  | 5.62 | 5.62 | 5.62 | 5.62 | 5.62 | 5.62 | 5.62 | 5.62 |
| ViB + ViF | Number in mmol of aliphatic unsaturated groups in (B) and (F) |  | 20.87 | 20.87 | 20.87 | 20.87 | 20.87 | 20.87 | 16.98 | 20.87 |
| HS/(ViB + ViF) |  |  | 0.98 | 0.98 | 0.98 | 0.98 | 0.98 | 0.98 | 1.20 | 0.97 |
| HS/ViF |  |  | 3.62 | 3.62 | 3.62 | 3.62 | 3.62 | 3.62 | 3.62 | 3.59 |
| HS/ViB |  |  | 1.34 | 1.34 | 1.34 | 1.34 | 1.34 | 1.34 | 1.79 | 1.32 |
| HS/ViB1 |  |  | 2.75 | 2.75 | 2.75 | 2.75 | 2.75 | 2.75 | 5.80 | 2.72 |

TABLE 2

|  |  | Example 1 | Exampe 2 | Exampe 3 | Example 4 | Example 5 | Example 6 | Example 7 | Example 8 |
|---|---|---|---|---|---|---|---|---|---|
| Viscosity of resin composition cP/23° C. | 20 rpm | 21,000 | 22,000 | 28,000 | 29,000 | 19,000 | 22,000 | 51,000 | 27,000 |
|  | 10 pm | 34,000 | 35,000 | 45,000 | 47,000 | 31,000 | 35,000 | 84,000 | 44,000 |
| Thixotropy ratio | 10 rpm/20 rprn | 1.62 | 1.59 | 1.61 | 1.62 | 1.63 | 1.59 | 1.65 | 1.63 |
| E hardness after curing |  | 55 | 55 | 57 | 58 | 54 | 53 | 50 | 54 |
| Elongation % after curing |  | 110 | 110 | 120 | 120 | 90 | 130 | 130 | 130 |
| Specific gravity |  | 1.075 | 1.075 | 1.076 | 1.076 | 1.075 | 1.075 | 1.076 | 1.076 |
| Cohesive failure ratios % | Aluminum | 100 | 100 | 100 | 100 | 100 | 100 | 100 | 100 |
|  | Copper | 100 | 100 | 100 | 96 | 100 | 100 | 100 | 100 |
|  | Stainless steel | 100 | 100 | 100 | 100 | 100 | 100 | 100 | 100 |
|  | Epoxy glass | 100 | 100 | 100 | 100 | 100 | 100 | 100 | 100 |
|  | PET | 100 | 100 | 100 | 100 | 100 | 100 | 100 | 100 |
|  | Acrylic | 100 | 100 | 95 | 90 | 100 | 100 | 100 | 100 |
|  | Polycarbonate | 100 | 100 | 95 | 95 | 100 | 100 | 100 | 100 |
| Fluidity | Fluidity 1 (mm) | 2.0 | 3.0 | 0.5 | 0.5 | 3.0 | 0.0 | 1.0 | 2.0 |
|  | Fluidity 2 (mm) | 0.0 | 0.0 | 0.0 | 0.0 | 0.0 | 0.0 | 0.0 | 0.0 |
| Discharge amount, g/18 G needle; 10 sec | Immediately after production | 1.00 | 0.94 | 0.70 | 0.63 | 0.95 | 1.09 | 0.44 | 0.77 |
|  | After 4 weeks of storage at room temperature | 0.97 | 0.90 | 0.63 | 0.65 | 0.63 | 1.01 | 0.40 | 0.69 |
| Stringless | mm | 1.0 | 1.0 | 0.5 | 1.0 | 3.0 | 1.0 | 1.5 | 1.0 |

TABLE 3

|  | Product name | Example 9 | Example 10 | Example 11 | Example 12 | Example 13 | Example 14 | Example 15 | Example 16 | Example 17 |
|---|---|---|---|---|---|---|---|---|---|---|
| (a-1) | Mercaptopropyl group-containing polymethyl-siloxane (230 cP) |  | 21.2 | 21.2 | 21.2 | 21.2 | 21.2 | 21.2 | 21.2 | 21.2 | 21.2 |
| (a-2) | Mercaptopropyl group-containing polymethyl-siloxane (1090 cP) |  |  |  |  |  |  |  |  |  |  |
| (b1-1) | Vinyl-terminated polymethylphenyl-siloxane (1050 cP) |  | 34.9 | 34.9 | 34.9 | 34.9 | 34.9 | 34.9 | 34.9 | 34.9 | 34.9 |
| (b1-2) | Vinyl-terminated polymethylphenyl-siloxane (3280 cP) |  | 24.6 | 24.6 | 24.6 | 24.6 | 24.6 | 24.6 | 24.6 | 24.6 | 24.6 |
| (b1-3) | Vinyl-terminated polymethylphenyl-siloxane (11050 cP) |  |  |  |  |  |  |  |  |  |  |
| (b2-1) | $M_6D^{vi}Q_8$ resin |  | 7.8 | 7.8 | 7.8 | 7.8 | 7.8 | 7.8 | 7.8 | 7.8 | 7.8 |
| (c-1) | 2-Hydroxy-2-methyl-propiophenone |  | 0.46 | 0.46 | 0.46 | 0.46 | 0.46 | 0.46 | 0.46 | 0.46 | 0.46 |
| (c-2) | 2,2-Dimethoxy-1,2-diphenylethan-1-one |  | 0.23 | 0.23 | 0.23 | 0.23 | 0.23 | 0.23 | 0.23 | 0.23 | 0.23 |
| (d-1) | Silazane-treated fumed silica (BET specific surface area 137 m$^2$/g) |  | 11.4 | 11.4 | 11.4 | 11.4 | 11.4 | 11.4 | 11.4 | 11.4 | 11.4 |
| (e-1) | Polypropylene glycol (1000) | SANNIX PP-1000 | 0.005 |  |  |  |  |  |  |  |  |
| (e-2) | Polypropylene glycol (2000) | SANNIX PP-2000 |  |  | 0.10 |  |  |  |  | 0.50 | 1.0 |
| (e-3) | Polypropylene glycol (3000) | SANNIX PP-3000 |  | 0.005 |  |  |  |  |  |  |  |
| (e-4) | Polyethylene glycol (1000) | PEG-1000 |  |  |  |  | 0.005 |  |  |  |  |
| (e-5) | Diethylene glycol dimethyl ether | B0498 |  |  |  |  |  | 0.005 |  |  |  |
| (e-6) | Polyalkylene glycol derivative (water-insoluble type) | UNILUB MB-38 |  |  |  |  |  |  | 0.005 |  |  |
| (e-7) | Polypropylene glycol (2000) | SANNIX PP-200 |  |  |  |  |  |  | 0.005 |  |  |
| (f-1) | 3-Methacryloxy-propyltrimethoxy-silane |  | 1.4 | 1.4 | 1.4 | 1.4 | 1.4 | 1.4 | 1.4 | 1.4 | 1.4 |
| (g-1) | P-t-butylcatechol |  | 0.04 | 0.04 | 0.04 | 0.04 | 0.04 | 0.04 | 0.04 | 0.04 | 0.04 |
| HS: | Number in mmol of mercaptoalkyl groups in (A) |  | 20.36 | 20.36 | 20.36 | 20.36 | 20.36 | 20.36 | 20.36 | 20.36 | 20.36 |
| ViB1: | Number in mmol of aliphatic unsaturated groups in (B1) |  | 7.40 | 7.40 | 7.40 | 7.40 | 7.40 | 7.40 | 7.40 | 7.40 | 7.40 |
| ViB2: | Number in mmol of aliphatic unsaturated groups in (B2) |  | 7.85 | 7.85 | 7.85 | 7.85 | 7.85 | 7.85 | 7.85 | 7.85 | 7.85 |
| ViB: | Number in mmol of aliphatic unsaturated groups in (B) |  | 15.25 | 15.25 | 15.25 | 15.25 | 15.25 | 15.25 | 15.25 | 15.25 | 15.25 |
| Proportion (%) of aliphatic unsaturated groups in (B2) relative to aliphatic unsaturated groups in (B) |  |  | 51.5% | 51.5% | 51.5% | 51.5% | 51.5% | 51.5% | 51.5% | 51.5% | 51.5% |
| ViF: | Number in mmol of aliphatic unsaturated groups in (F) |  | 5.62 | 5.62 | 5.62 | 5.62 | 5.62 | 5.62 | 5.62 | 5.62 | 5.62 |
| ViB + ViF | Number in mmol of aliphatic |  | 20.87 | 20.87 | 20.87 | 20.87 | 20.87 | 20.87 | 20.87 | 20.87 | 20.87 |

TABLE 3-continued

|  | Product name | Example 9 | Example 10 | Example 11 | Example 12 | Example 13 | Example 14 | Example 15 | Example 16 | Example 17 |
|---|---|---|---|---|---|---|---|---|---|---|
| HS/ (ViB + ViF) | unsaturated groups in (B) and (F) | 0.98 | 0.98 | 0.98 | 0.98 | 0.98 | 0.98 | 0.98 | 0.98 | 0.98 |
| HS/ ViF |  | 3.62 | 3.62 | 3.62 | 3.62 | 3.62 | 3.62 | 3.62 | 3.62 | 3.62 |
| HS/ ViB |  | 1.34 | 1.34 | 1.34 | 1.34 | 1.34 | 1.34 | 1.34 | 1.34 | 1.34 |
| HS/ ViB1 |  | 2.75 | 2.75 | 2.75 | 2.75 | 2.75 | 2.75 | 2.75 | 2.75 | 2.75 |

TABLE 4

|  |  | Example 9 | Example 10 | Example 11 | Example 12 | Example 13 | Example 14 | Example 15 | Example 16 | Example 17 |
|---|---|---|---|---|---|---|---|---|---|---|
| Viscosity of resin composition cP/23° C. | 20 rpm | 20,600 | 21,700 | 27,900 | 20,900 | 19,500 | 21,200 | 20,100 | 22,700 | 26,100 |
|  | 10 rpm | 32,900 | 35,200 | 46,200 | 33,200 | 31,200 | 33,900 | 31,200 | 38,200 | 44,300 |
| Thixotropy ratio | 10 rpm/20 rpm | 1.60 | 1.62 | 1.66 | 1.59 | 1.60 | 1.60 | 1.55 | 1.68 | 1.70 |
| E hardness after curing |  | 55 | 54 | 54 | 55 | 54 | 52 | 54 | 55 | 56 |
| Elongation % after curing |  | 100 | 110 | 110 | 110 | 100 | 120 | 110 | 110 | 100 |
| Specific gravity |  | 1.075 | 1.075 | 1.075 | 1.075 | 1.075 | 1.075 | 1.075 | 1.075 | 1.075 |
| Cohesive failure ratios % | Aluminum | 100 | 100 | 100 | 100 | 100 | 100 | 100 | 100 | 100 |
|  | Copper | 100 | 100 | 100 | 100 | 100 | 100 | 100 | 100 | 100 |
|  | Stainless steel | 100 | 100 | 100 | 100 | 100 | 100 | 100 | 100 | 100 |
|  | Epoxy glass | 100 | 100 | 100 | 100 | 100 | 100 | 100 | 100 | 100 |
|  | PET | 100 | 100 | 100 | 100 | 100 | 100 | 100 | 100 | 100 |
|  | Acrylic | 100 | 100 | 100 | 100 | 85 | 100 | 95 | 100 | 100 |
|  | Polycarbonate | 100 | 100 | 100 | 100 | 90 | 100 | 90 | 100 | 100 |
| Fluidity | Fluidity 1 (mm) | 2.0 | 2.0 | 0.5 | 2.0 | 3.0 | 2.0 | 3.0 | 0.5 | 0.0 |
|  | Fluidity 2 (mm) | 0.0 | 0.0 | 0.0 | 0.0 | 0.0 | 0.0 | 0.5 | 0.0 | 0.0 |
| Discharge amount, g/18 G needle; 10 sec | Immediately after production | 1.02 | 0.98 | 0.92 | 1.02 | 1.03 | 0.97 | 1.05 | 0.97 | 0.87 |
|  | After 4 weeks of storage at room temperature | 0.98 | 0.94 | 0.88 | 0.97 | 0.97 | 0.92 | 1.01 | 0.93 | 0.82 |
| Stringiness | mm | 1.0 | 1.0 | 0.0 | 1.0 | 2.0 | 2.0 | 2.0 | 0.0 | 0.0 |

TABLE 5

|  | Product name | Example 18 | Example 19 | Example 20 | Example 21 | Example 22 | Example 23 | Example 24 | Example 25 |
|---|---|---|---|---|---|---|---|---|---|
| (a-1) | Mercaptopropyl group-containing polymethylsiloxane (230 cP) |  | 14.3 | 14.3 | 14.3 | 14.3 | 14.6 | 14.9 | 15.4 | 12.1 |
| (a-2) | Mercaptopropyl group-containing polymethylsiloxane (1090 cP) |  |  |  |  |  |  |  |  |  |
| (b1-1) | Vinyl-terminated polymethylphenylsiloxane (1050 cP) |  | 40.5 | 11.5 | 64.8 | 49.6 | 66.1 | 67.4 | 69.4 | 62.0 |
| (b1-2) | Vinyl-terminated polymethylphenylsiloxane (3280 cP) |  | 26.1 | 53.3 |  | 24.6 |  |  |  |  |
| (b1-3) | Vinyl-terminated polymethylphenylsiloxane (11050 cP) |  |  |  |  |  |  |  |  |  |
| (b21) | $M_6D^{vi}Q_8$ resin |  | 7.6 | 7.7 | 7.7 |  | 7.8 | 8.0 | 8.2 | 8.2 |
| (c-1) | 2-Hydroxy-2-methylpropiophenone |  |  | 0.46 | 0.46 |  |  |  |  | 0.46 |
| (c-2) | 2,2-Dimethoxy-1,2-diphenylethan-1-one |  |  | 0.46 | 0.46 |  |  |  |  | 0.46 |
| (c-3) | 1-Hydroxy-cyclohoxyl phenyl ketone |  | 0.36 |  |  | 0.36 | 0.36 | 0.36 | 0.36 |  |
| (c-4) | Bis(2,4,6-trimethylbenzoyl)-phenylphosphine oxide |  | 0.10 |  |  | 0.10 | 0.10 | 0.10 | 0.10 |  |

TABLE 5-continued

|  | Product name | Example 18 | Example 19 | Example 20 | Example 21 | Example 22 | Example 23 | Example 24 | Example 25 |
|---|---|---|---|---|---|---|---|---|---|
| (d-1) Sliazane-treated fumed silica (BET specific surface area 137 m$^2$/g) |  | 11.5 | 13.2 | 13.2 | 11.4 | 11.5 | 9.8 | 7.1 | 17.7 |
| (e-2) Polypropylene glycol (2000) | SANNIX PP-2000 | 0.005 | 0.005 | 0.005 | 0.005 | 0.005 | 0.005 | 0.005 | 0.003 |
| (f-1) 3-Methacryloxypropytrimethoxysilane |  | 1.4 | 1.4 | 1.4 | 1.4 | 1.4 | 1.5 | 1.5 | 1.5 |
| (g-1) P-t-butylcateohol |  | 0.04 | 0.04 | 0.04 | 0.04 | 0.04 | 0.04 | 0.04 | 0.04 |
| HS: Number in mmol of mercaptoalkyl groups in (A) |  | 13.73 | 13.77 | 13.77 | 13.77 | 14.03 | 14.29 | 14.75 | 11.57 |
| ViB1: Number in mmol of aliphatic unsaturated groups in (B1) |  | 8.34 | 6.73 | 9.40 | 9.53 | 9.58 | 9.77 | 10.06 | 8.99 |
| ViB2: Number in mmol of aliphatic unsaturated groups in (B2) |  | 7.69 | 7.71 | 7.71 | 0.00 | 7.85 | 8.01 | 8.25 | 8.26 |
| ViB: Number in mmol of aliphatic unsaturated groups in (B) |  | 16.03 | 14.44 | 17.11 | 9.53 | 17.43 | 17.78 | 18.31 | 17.25 |
| Proportion (%) of aliphatic unsaturated groups in (B2) relative to aliphatic unsaturated groups in (B) |  | 48.0% | 53.4% | 45.1% | 0.0% | 45.0% | 45.1% | 45.1% | 47.9% |
| ViF: Number in mmol of aliphatic unsaturated groups in (F) |  | 5.52 | 5.64 | 5.64 | 5.52 | 5.76 | 5.84 | 6.05 | 6.05 |
| ViB + ViF Number in mmol of aliphatic unsaturated groups in (B) and (F) |  | 21.55 | 20.08 | 22.75 | 15.05 | 23.19 | 23.62 | 24.36 | 23.30 |
| HS/(ViB + ViF) |  | 0.64 | 0.69 | 0.61 | 0.91 | 0.61 | 0.60 | 0.61 | 0.50 |
| HS/ViF |  | 2.49 | 2.44 | 2.44 | 2.49 | 2.44 | 2.45 | 2.44 | 1.91 |
| HS/ViB |  | 0.86 | 0.95 | 0.80 | 1.44 | 0.80 | 0.80 | 0.81 | 0.67 |
| HS/ViB1 |  | 1.65 | 2.05 | 1.46 | 1.44 | 1.46 | 1.46 | 1.47 | 1.29 |

TABLE 6

|  |  | Example 18 | Example 19 | Example 20 | Example 21 | Example 22 | Example 23 | Example 24 | Example 25 |
|---|---|---|---|---|---|---|---|---|---|
| Viscosity of resin composition cP/23° C. | 20 rpm | 20,200 | 27,200 | 17,200 | 21,300 | 17,200 | 14,500 | 11,800 | 54,100 |
|  | 10 pm | 32,700 | 42,200 | 27,200 | 33,300 | 27,300 | 22,800 | 18,300 | 88,900 |
| Thixotropy ratio | 10 rpm/20 rpm | 1.62 | 1.55 | 1.58 | 1.56 | 1.59 | 1.57 | 1.55 | 1.64 |
| E hardness after curling |  | 38 | 35 | 40 | 32 | 44 | 41 | 37 | 63 |
| Elongation % after curing |  | 130 | 150 | 110 | 110 | 110 | 110 | 100 | 120 |
| Specific gravity |  | 1.074 | 1.074 | 1.074 | 1.074 | 1.074 | 1.072 | 1.069 | 1.083 |
| Cohesive failure ratios % | Aluminum | 100 | 100 | 100 | 100 | 100 | 100 | 100 | 100 |
|  | Copper | 100 | 100 | 100 | 100 | 100 | 100 | 100 | 100 |
|  | Stainless steel | 100 | 100 | 100 | 100 | 100 | 100 | 100 | 100 |
|  | Epoxy glass | 100 | 100 | 100 | 100 | 100 | 100 | 100 | 100 |
|  | PET | 100 | 100 | 100 | 100 | 100 | 100 | 100 | 100 |
|  | Acrylic | 100 | 100 | 100 | 100 | 100 | 100 | 100 | 100 |
|  | Polycarbonate | 100 | 100 | 100 | 100 | 100 | 100 | 100 | 100 |
| Fluidity | Fluidity 1 (mm) | 2.0 | 1.0 | 3.0 | 2.0 | 3.0 | 3.0 | 3.0 | 3.0 |
|  | Fluidity 2 (mm) | 0.0 | 0.0 | 0.0 | 0.0 | 0.0 | 0.0 | 0.0 | 0.0 |
| Discharge amount, g/18 G needle, 10 sec | Immediately after production | 0.99 | 0.68 | 0.83 | 1.02 | 1.01 | 1.22 | 1.33 | 0.55 |
|  | After 4 weeks of storage at room temperature | 0.95 | 0.65 | 0.80 | 1.00 | 0.98 | 1.20 | 1.29 | 0.52 |
| Stringiness | mm | 0.0 | 1.0 | 0.0 | 1.0 | 1.0 | 1.5 | 2.0 | 0.0 |

TABLE 7

|  | Product name | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| (a-1) Mercaptopropyl group-containing polymethylsiloxane (230 cP) |  | 21.2 | 21.2 | 17.8 | 21.2 | 16.7 | 21.2 | 16.7 | 21.2 | 21.2 |

TABLE 7-continued

|  |  | Product name | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| (a-2) | Mercaptopropyl group-containing polymethylsiloxane (1000 cP) |  |  |  |  |  |  |  |  |  |  |
| (b1-1) | Vinyl-terminated polymethylphenylsiloxane (1050 cP) |  | 34.9 |  |  |  |  |  |  | 34.9 | 34.9 |
| (b1-2) | Vinyl-terminated polymethylphenylsiloxane (3280 cP) |  | 24.6 |  |  |  |  |  |  | 24.6 | 24.6 |
| (b1-3) | Vinyl-terminated polymethylphenylsiloxane (11050 cP) |  |  | 59.5 | 64.0 |  |  |  |  |  |  |
| (b1-4) | Vinyl-terminated polymethylphenylsiloxane (20450 cP) |  |  |  |  | 59.5 | 64.0 | 59.5 | 64.0 |  |  |
| (b2-1) | $M_6D^{vi}Q_8$ resin |  | 7.8 | 7.8 | 7.8 | 7.8 | 7.8 | 7.8 | 7.8 | 7.8 | 7.8 |
| (c-1) | 2-Hydroxy-2-methylpropiophenone |  | 0.46 | 0.46 | 0.46 | 0.46 | 0.46 | 0.46 |  |  |  |
| (c-2) | 2,2-Dimethoxy-1,2-diphenylethan-1-one |  | 0.23 | 0.23 | 0.23 | 0.23 | 0.23 | 0.23 | 0.23 | 0.23 | 0.23 |
| (d-1) | Silazane-treated fumed silica (BET specific surface area 137 $m^2/g$) |  | 11.4 | 11.4 | 11.4 | 11.4 | 11.4 | 11.4 | 11.4 |  |  |
| (d-5) | Silazane-treated fumed silica (BET specific surface area 260 $m^2/g$) | AEROSIL R812 |  |  |  |  |  |  |  | 11.4 |  |
| (d-7) | Silazane-treated fumed silica (BET specific surface area 310 $m^2/g$) |  |  |  |  |  |  |  |  |  | 11.4 |
| (e-2) | Polypropylene glycol (2000) | SANNIX PP-2000 |  |  |  |  |  | 0.005 | 0.005 | 0.005 | 0.0005 |
| (f-1) | 3-Methacryloxypropyltrimethoxysilane |  | 1.4 | 1.4 | 1.4 | 1.4 | 1.4 | 1.4 | 1.4 | 1.4 | 1.4 |
| (g-1) | P-t-butylcatechol |  | 0.04 | 0.04 | 0.04 | 0.04 | 0.04 | 0.04 | 0.04 | 0.04 | 0.04 |
| HS: | Number in mmol of mercaptoalkyl groups in (A) |  | 20.36 | 20.36 | 17.06 | 20.36 | 16.00 | 20.36 | 16.00 | 20.36 | 20.36 |
| ViB1: | Number in mmol of aliphatic unsaturated groups in (B1) |  | 7.40 | 3.51 | 3.71 | 2.44 | 2.62 | 2.44 | 2.62 | 7.40 | 7.40 |
| ViB2: | Number in mmol of aliphatic unsaturated groups in (B2) |  | 7.85 | 7.85 | 7.85 | 7.85 | 7.85 | 7.85 | 7.85 | 7.85 | 7.85 |
| ViB: | Number in mmol of aliphatic unsaturated groups in (B) |  | 15.25 | 11.36 | 11.56 | 10.29 | 10.47 | 10.29 | 10.47 | 15.25 | 15.25 |
| Proportion (%) of aliphatic unsaturated groups in (B2) relative to aliphatic unsaturated groups in (B) |  |  | 51.5% | 69.1% | 67.9% | 76.3% | 75.0% | 76.3% | 75.0% | 51.5% | 51.5% |
| ViF: | Number in mmol of aliphatic unsaturated groups in (F) |  | 5.62 | 5.62 | 5.62 | 5.62 | 5.62 | 5.62 | 5.62 | 5.62 | 5.62 |

TABLE 7-continued

| | Product name | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| ViB + ViF: | Number in mmol of aliphatic unsaturated groups in (B) and F) | 20.87 | 16.98 | 17.18 | 15.91 | 16.09 | 15.91 | 16.09 | 20.87 | 20.87 |
| HS/ (ViB + ViF) | | 0.98 | 1.20 | 0.99 | 1.28 | 0.99 | 1.28 | 0.99 | 0.98 | 0.98 |
| HS/ ViF | | 3.62 | 3.62 | 3.04 | 3.62 | 2.85 | 3.62 | 2.85 | 3.62 | 3.62 |
| HS/ ViB | | 1.34 | 1.79 | 1.48 | 1.98 | 1.53 | 1.98 | 1.53 | 1.34 | 1.34 |
| HS/ ViB1 | | 2.75 | 6.80 | 4.60 | 8.34 | 6.11 | 8.34 | 6.10 | 2.75 | 2.75 |

TABLE 8

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Viscosity of resin composition cP/23° C. | 20 rpm | 20,000 | 48,000 | 50,000 | 65,000 | 73,000 | 69,000 | 75,000 | 35,000 | 30,000 |
| | 10 rpm | 29,000 | 71,000 | 73,000 | 97,000 | 107,000 | 115,000 | 123,000 | 55,000 | 48,000 |
| Thixotropy ratio | 10 rpm/20 rpm | 1.45 | 1.48 | 1.46 | 1.49 | 1.47 | 1.67 | 1.64 | 1.57 | 1.60 |
| E hardness after curing | | 55 | 51 | 48 | 50 | 45 | 44 | 51 | 57 | 58 |
| Elongation % after curing | | 110 | 130 | 150 | 140 | 160 | 140 | 160 | 130 | 100 |
| Specific gravity | | 1.075 | 1.076 | 1.075 | 1.076 | 1.075 | 1.076 | 1.075 | 1.076 | 1.077 |
| Cohesive failure ratio % | Aluminum | 100 | 100 | 100 | 100 | 100 | 100 | 100 | 100 | 100 |
| | Copper | 100 | 100 | 100 | 100 | 100 | 100 | 100 | 100 | 90 |
| | Stainless steel | 100 | 100 | 100 | 100 | 100 | 100 | 100 | 100 | 100 |
| | Epoxy glass | 100 | 100 | 100 | 100 | 100 | 100 | 100 | 100 | 100 |
| | PET | 100 | 100 | 100 | 100 | 100 | 100 | 100 | 100 | 60 |
| | Acrylic | 100 | 100 | 100 | 100 | 100 | 100 | 100 | 100 | 50 |
| | Polycarbonate | 100 | 100 | 100 | 100 | 100 | 100 | 100 | 100 | 60 |
| Fluidity | Fluidity 1 (mm) | Immeasurable | Immeasurable | Immeasurable | Immeasurable | Immeasurable | 1.0 | 1.0 | 0.0 | 0.0 |
| | Fluidity 2 (mm) | Immeasurable | Immeasurable | Immeasurable | Immeasurable | Immeasurable | 0.0 | 0.0 | 0.0 | 0.0 |
| Discharge amount, g/18 G needle; 10 sec | Immediately after production | 1.05 | 0.49 | 0.43 | 0.38 | 0.33 | 0.31 | 0.27 | 0.33 | 0.31 |
| | After 4 weeks of storage at room temperature | 1.02 | 0.44 | 0.40 | 0.34 | 0.29 | 0.26 | 0.22 | 0.27 | 0.19 |
| Stringiness | mm | Immeasurable | Immeasurable | Immeasurable | Immeasurable | Immeasurable | 3.0 | 3.5 | 0.0 | 0.0 |

TABLE 9

| | Product name | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| (a-1) | Mercaptopropyl group-containing polymethylsiloxane (230 cP) | 21.2 | 21.2 | 21.2 | 21.2 | 21.2 | 21.2 | 21.2 | 21.2 | 12.1 |
| (a-2) | Mercaptopropyl group-containing | | | | | | | | | |

TABLE 9-continued

|  |  | Product name | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|---|
|  | polymethylsiloxane (1090 cP) |  |  |  |  |  |  |  |  |  |  |
| (b1-1) | Vinyl-terminated polymethylphenyl-siloxane (1050 cP) |  | 34.9 | 34.9 | 34.9 | 34.9 | 34.9 | 34.9 | 34.9 | 34.9 | 62.0 |
| (b1-2) | Vinyl-terminated polymethylphenyl-siloxane (3280 cP) |  | 24.6 | 24.6 | 24.6 | 24.6 | 24.6 | 24.6 | 24.6 | 24.6 |  |
| (b1-3) | Vinyl-terminated polymethylphenyl-siloxane (11050 cP) |  |  |  |  |  |  |  |  |  |  |
| (b2-1) | $M_6D^{vi}Q_8$ resin |  | 7.8 | 7.8 | 7.8 | 7.8 | 7.8 | 7.8 | 7.8 | 7.8 | 8.2 |
| (c-1) | 2-Hydroxy-2-methylproplo-phenone |  | 0.46 | 0.46 | 0.46 | 0.46 | 0.46 | 0.46 | 0.46 | 0.46 | 0.46 |
| (c-2) | 2,2-Dimethoxy-1,2-diphenylethan-1-one |  | 0.23 | 0.23 | 0.23 | 0.23 | 0.23 | 0.23 | 0.23 | 0.23 | 0.48 |
| (d-1) | Silazane-treated fumed silica (BET specific surface area 137 m$^2$/g) |  |  |  |  |  |  |  |  |  | 17.7 |
| (d-8) | Fumed silica (BET specific surface area 140 m$^2$/g) | AEROSIL 130 | 11.4 |  |  |  |  |  |  |  |  |
| (d-9) | Dimethyldichloro-silane-treated fumed silica (BET specific surface area 120 m$^2$/g) | AEROSIL R972 |  | 11.4 |  |  |  |  |  |  |  |
| (d-10) | Dimethyldichloro-silane-treated fumed silica (BET specific surface area 170 m$^2$/g) | AEROSIL R974 |  |  | 11.4 |  |  |  |  |  |  |
| (d-11) | Octamethylcyclote-trasilane-treated fumed silica (BET specific surface area 150 m$^2$/g) | AEROSIL R104 |  |  |  | 11.4 |  |  |  |  |  |
| (d-12) | Silicone oil-treated fumed silica (BET specific surface area 110 m$^2$/g) | AEROSIL RY200 |  |  |  |  | 11.4 |  |  |  |  |
| (d-13) | Silazane-treated fumed silica (BET specific surface area 40 m$^2$/g) | AEROSIL NAX50 |  |  |  |  |  | 11.4 |  |  |  |
| (d-14) | Octyltrimethoxy-silane-treated fumed silica (BET specific surface area 150 m$^2$/g) | AEROSIL R805 |  |  |  |  |  |  | 11.4 |  |  |
| (d-16) | Hexadecyltrimeth-oxysilane-treated fumed silica (BET specific surface area 180 m$^2$/g) | AEROSIL R816 |  |  |  |  |  |  |  | 11.4 |  |
| (e-2) | Polypropylene glycol (2000) | SANNIX PP-2000 | 0.005 | 0.005 | 0.005 | 0.005 | 0.005 | 0.005 | 0.005 | 0.005 |  |
| (f-1) | 3-Methacryloxy-propyltrimethoxy-silane |  | 1.4 | 1.4 | 1.4 | 1.4 | 1.4 | 1.4 | 1.4 | 1.4 | 1.5 |
| (g-1) | P-t-butylcatechol |  | 0.04 | 0.04 | 0.04 | 0.04 | 0.04 | 0.04 | 0.04 | 0.04 | 0.04 |
| HS: | Number in mmol of mercaptoalkyl groups in (A) |  | 20.36 | 20.36 | 20.36 | 20.36 | 20.36 | 20.36 | 20.36 | 20.36 | 11.57 |
| ViB1: | Number in mmol of aliphatic unsaturated groups in (B1) |  | 7.40 | 7.40 | 7.40 | 7.40 | 7.40 | 7.40 | 7.40 | 7.40 | 8.99 |
| ViB2: | Number in mmol of aliphatic unsaturated groups in (B2) |  | 7.85 | 7.85 | 7.85 | 7.85 | 7.85 | 7.85 | 7.85 | 7.85 | 8.26 |

TABLE 9-continued

| | Product name | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| ViB: | Number in mmol of aliphatic unsaturated groups in (B) | 15.25 | 15.25 | 15.25 | 15.25 | 15.25 | 15.25 | 15.25 | 15.25 | 17.25 |
| Proportion (%) of aliphatic unsaturated groups in (B2) relative to aliphatic unsaturated groups in (B) | | 51.5% | 51.5% | 51.5% | 51.5% | 51.5% | 51.5% | 51.5% | 51.5% | 47.9% |
| ViF: | Number in mmol of aliphatic unsaturated groups in (E) | 5.62 | 5.62 | 5.62 | 5.62 | 5.62 | 5.62 | 5.62 | 5.62 | 6.05 |
| ViB + ViF: | Number in mmol of aliphatic unsaturated groups in (B) and (F) | 20.87 | 20.87 | 20.87 | 20.87 | 20.87 | 20.87 | 20.87 | 20.87 | 23.30 |
| HS/(ViB + ViF) | | 0.98 | 0.98 | 0.98 | 0.98 | 0.98 | 0.98 | 0.98 | 0.98 | 0.50 |
| HS/ViF | | 3.62 | 3.62 | 3.62 | 3.62 | 3.62 | 3.62 | 3.62 | 3.62 | 1.91 |
| HS/ViB | | 1.34 | 1.34 | 1.34 | 1.34 | 1.34 | 1.34 | 1.34 | 1.34 | 0.67 |
| HS/ViB1 | | 2.75 | 2.75 | 2.75 | 2.75 | 2.75 | 2.75 | 2.75 | 2.75 | 1.29 |

TABLE 10

| | | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| Viscosity of resin composition cP/23° C. | 20 rpm | 18,000 | 24,000 | 33,000 | 22,000 | 22,000 | 13,000 | 23,000 | 29,000 | 52.200 |
| | 10 pm | 28,000 | 40,000 | 55,000 | 35,000 | 33,000 | 18,000 | 37,000 | 46,000 | 82,200 |
| Thixotropy ratio | 10 rpm/20 rpm | 1.56 | 1.67 | 1.67 | 1.59 | 1.50 | 1.38 | 1.61 | 1.59 | 1.57 |
| E hardness after curing | | 52 | 54 | 57 | 55 | 52 | 43 | 55 | 55 | 63 |
| Elongation % after curing | | 80 | 90 | 100 | 120 | 110 | 70 | 110 | 90 | 120 |
| Specific gravity | | 1.075 | 1.075 | 1.075 | 1.075 | 1.075 | 1.073 | 1.075 | 1.075 | 1.083 |
| Cohesive failure ratios % | Aluminum | 100 | 100 | 100 | 100 | 100 | 100 | 100 | 100 | 100 |
| | Copper | 70 | 100 | 80 | 100 | 90 | 100 | 100 | 100 | 100 |
| | Stainless steel | 50 | 100 | 100 | 100 | 90 | 100 | 100 | 100 | 100 |
| | Epoxy glass | 100 | 100 | 100 | 100 | 100 | 100 | 100 | 100 | 100 |
| | PET | 100 | 100 | 100 | 100 | 100 | 100 | 100 | 100 | 100 |
| | Acrylic | 0 | 80 | 30 | 70 | 50 | 100 | 100 | 90 | 100 |
| | Polycarbonate | 5 | 95 | 40 | 80 | 60 | 100 | 100 | 95 | 100 |
| Fluidity | Fluidity 1 (mm) | 4.0 | 0.0 | 0.0 | 0.0 | 2.0 | 15.0 | 0.0 | 0.0 | 11.0 |
| | Fluidity 2 (mm) | 1.0 | 0.0 | 0.0 | 0.0 | 0.0 | 4.0 | 0.0 | 0.0 | 4.0 |
| Discharge amount, g/18 G needle; 10 sec | Immediately after production | 0.98 | 0.78 | 0.36 | 0.77 | 0.88 | 1.33 | 0.74 | 0.67 | 0.56 |
| | After 4 weeks of storage at room temperature | 0.18 | 0.21 | 0.15 | 0.16 | 0.19 | 0.67 | 0.33 | 0.19 | 0.52 |
| Stringiness | mm | 3.0 | 0.0 | 0.0 | 0.0 | 3.0 | 5.0 | 2.0 | 3.0 | 7.0 |

INDUSTRIAL APPLICABILITY

The resin compositions for electric/electronic components according to the present invention are less stringy and have good ejectability to realize excellent workability, and retain the shapes after being applied and scarcely flow out of the applied areas. In particular, the resin compositions may be suitably used for electric/electronic components such as semiconductor devices, printed circuit boards and battery materials.

The invention claimed is:

1. A resin composition for an electric/electronic component, the resin composition comprising:
    (A) a polyorganosiloxane that contains a mercaptoalkyl group bonded to a silicon atom and has a viscosity at 23° C. of 20 to 3,000 cP;
    (B) a polyorganosiloxane containing an aliphatic unsaturated group wherein the polyorganosiloxane (B) includes:
        (B1) a linear polyorganosiloxane represented by the formula (I):

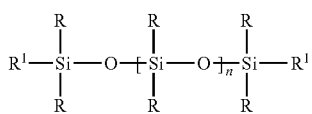

wherein:
        each $R^1$ is independently an aliphatic unsaturated group,
        each R is independently a C1-C6 alkyl group or a C6-C12 aryl group, and
        n is a value such that a viscosity of the linear polyorganosiloxane (B1) at 23° C. is 100 to 12,000 cP;
    and optionally
        (B2) a branched polyorganosiloxane including a $SiO_{4/2}$ unit, an $R'_3SiO_{1/2}$ unit and an $R'_2SiO_{2/2}$ unit, and optionally further an $R'SiO_{3/2}$ unit wherein each R' independently represents a C1-C6 alkyl group or an aliphatic unsaturated group, and at least three R' groups per molecule of the branched polyorganosiloxane (B2) are aliphatic unsaturated groups;
    (C) a photoreaction initiator;
    (D) a chemically surface-treated silica having a BET specific surface area of 50 to 250 $m^2/g$ and a pH of 5.0 to 9.0; and
    (E) a polyoxyalkylene glycol in which an alkylene unit is a linear or branched alkylene group having 2 to 4 carbon atoms, and/or a derivative of the polyoxyalkylene glycol,
    wherein:
    the ratio of the number of mercaptoalkyl groups in (A) to the total number of aliphatic unsaturated groups in (B) is 0.45 to 2.00,
    the content of (D) is 0.5 to 26 parts by mass relative to 100 parts by mass of (B),
    the proportion of the content of (E) is 0.001 to 1.0 mass % relative to the total mass of (A) to (E), and
    a viscosity of the resin composition at 23° C. is 500 to 100,000 cP.

2. The resin composition according to claim 1, wherein (D) is a chemically surface-treated fumed silica.

3. The resin composition according to claim 2, wherein (D) has been chemically treated with a silazane compound or with an alkoxysilane compound having a linear or branched alkyl group with 6 to 18 carbon atoms.

4. The resin composition according to claim 2, wherein (D) has been chemically treated with hexamethyldisilazane or octyltrimethoxysilane.

5. The resin composition according to claim 2, wherein the carbon content in (D) is 2.0 to 10.0 mass %.

6. The resin composition according to claim 2, wherein the number average molecular weight of (E) is 500 to 10,000.

7. The resin composition according to claim 2, wherein (E) is polyoxyethylene glycol.

8. The resin composition according to claim 2, wherein (E) is polyoxypropylene glycol.

9. The resin composition according to claim 2, wherein the content of (C) is 0.05 to 50 parts by mass relative to 100 parts by mass of (B).

10. The resin composition according to claim 2, further comprising (F) an aliphatic unsaturated group-containing silane coupling agent.

11. The resin composition according to claim 1, wherein (D) has been chemically treated with a silazane compound or with an alkoxysilane compound having a linear or branched alkyl group with 6 to 18 carbon atoms.

12. The resin composition according to claim 1, wherein (D) has been chemically treated with hexamethyldisilazane or octyltrimethoxysilane.

13. The resin composition according to claim 1, wherein the carbon content in (D) is 2.0 to 10.0 mass %.

14. The resin composition according to claim 1, wherein the number average molecular weight of (E) is 500 to 10,000.

15. The resin composition according to claim 1, wherein (E) is polyoxyethylene glycol.

16. The resin composition according to claim 1, wherein (E) is polyoxypropylene glycol.

17. The resin composition according to claim 1, wherein the content of (C) is 0.05 to 50 parts by mass relative to 100 parts by mass of (B).

18. The resin composition according to claim 1, further comprising (F) an aliphatic unsaturated group-containing silane coupling agent.

19. The resin composition according to claim 1, which is a coating agent, a potting agent or a liquid gasket agent.

20. An electric/electronic component protected using the resin composition according to claim 1.

* * * * *